United States Patent
Sugai

(10) Patent No.: US 7,690,783 B2
(45) Date of Patent: Apr. 6, 2010

(54) INK FOR INKJET PRINTING, LITHOGRAPHIC PRINTING PLATE USING IT AND METHOD FOR MAKING SUCH PLATE

(75) Inventor: Masaharu Sugai, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 724 days.

(21) Appl. No.: 11/350,873

(22) Filed: Feb. 10, 2006

(65) Prior Publication Data

US 2006/0181591 A1 Aug. 17, 2006

(30) Foreign Application Priority Data

Feb. 16, 2005 (JP) ............... 2005-039570

(51) Int. Cl.
*B41J 2/01* (2006.01)
(52) U.S. Cl. .................. 347/102; 347/100; 347/95
(58) Field of Classification Search ........... 347/100, 347/95, 96, 101; 106/31.13, 31.27, 31.6; 523/160
See application file for complete search history.

(56) References Cited

U.S. PATENT DOCUMENTS

| 4,264,483 | A | * | 4/1981 | Laufer et al. .................. 522/10 |
| 4,476,006 | A | * | 10/1984 | Ohba et al. .................. 430/155 |
| 4,536,468 | A | | 8/1985 | Yasui et al. |
| 6,310,115 | B1 | | 10/2001 | Vanmaele et al. |
| 6,402,315 | B1 | | 6/2002 | Kato |
| 2002/0198289 | A1 | * | 12/2002 | Gummeson .................. 523/400 |
| 2003/0007052 | A1 | | 1/2003 | Huang et al. |
| 2003/0128264 | A1 | * | 7/2003 | Ishikawa et al. ............ 347/102 |
| 2004/0069182 | A1 | | 4/2004 | Nakajima |
| 2004/0106700 | A1 | | 6/2004 | Yamanouchi et al. |
| 2004/0189763 | A1 | * | 9/2004 | Zheng et al. ................ 347/100 |

FOREIGN PATENT DOCUMENTS

| EP | 0 641 648 A1 | 3/1995 |
| EP | 1 134 076 A2 | 9/2001 |
| EP | 1 484 368 A1 | 12/2004 |
| EP | 1 502 935 A1 | 2/2005 |
| EP | 1 571 184 A1 | 9/2005 |
| JP | 2003-192943 | 7/2003 |

* cited by examiner

*Primary Examiner*—Manish S Shah
(74) *Attorney, Agent, or Firm*—Sughrue Mion, PLLC

(57) ABSTRACT

The present invention provides an ink for use in inkjet printing which can be cured by irradiation of radiant ray, characterized in that said ink for use in inkjet printing contains at least a colorant, a polymerizable compound and a photopolymerization initiator, further including a compound capable of forming a complex with a metal, as well as a method for making a lithographic printing plate that doesn't need a development process using said ink, and such plate can solve the foregoing problem. The ink of the present invention for use in inkjet printing has an excellent adhesion between the ink cured by irradiation of radiant ray and a printing medium, as well as a lithographic printing plate using it and a method for making such plate.

3 Claims, No Drawings

INK FOR INKJET PRINTING, LITHOGRAPHIC PRINTING PLATE USING IT AND METHOD FOR MAKING SUCH PLATE

FIELD OF THE INVENTION

The present invention relates to an ink for use in inkjet printing, a lithographic printing plate using it, and a method for making such plate. More in detail, the present invention relates to an ink for use in inkjet printing, which has an excellent adhesion between the ink cured by irradiation of radiant ray and a printing medium, as well as a lithographic printing plate using it and a method for making such plate.

BACKGROUND OF THE INVENTION

There are an electrophotography method, a sublime type and melted type heat transcript method, an inkjet method and the like as a method for recording an image that forms an image onto a recording medium such as paper based on the image data signal. The electrophotography method needs a process where an electrostatic latent image is formed on a photoreceptor drum by electrification and exposure, which makes its system complex, and results in the problem of high manufacturing cost, etc. Moreover, for the heat transcript method, its device is cheap, but it has the problem such as high running cost, emitting wastes and the like because an ink ribbon is used. On the other hand, for the inkjet method, its device is cheap, and it can efficiently use ink because ink is exhaled only in needed image part and it forms an image directly onto a recording medium, so that the running cost is low. In addition, it has few noise, and then it is excellent as an image recording method.

As one of the inkjet methods, there is a recording method that uses an ink for use in inkjet printing curable by irradiation of radiant ray.

For example, an ultraviolet-curing type inkjet method draws public attention in recent years in that since the method can be conducted with relative low odor and the method makes it possible to record onto a recording medium which is quick-drying and has no ink absorptivity. The Japanese Un-examined Patent Publication (hereunder referred to as "J.P. KOKAI") No. 2003-192943 proposes a composition which comprises a polymerizable compound consisting of particular acrylate compounds and a colorant, whose object is providing an ink for use in inkjet printing which can record an image that has no blot, high sensitivity and high adhesion to the recording medium, as well as that is safety with little skin stimulation and sensitization, even onto a substrate that is usually difficult to be recorded directly by the inkjet printing method.

Radical polymerizable acrylate compounds used as a component of ultraviolet-curing type ink are comparatively cheap and are characterized by high polymerization speed, on the other hand, they have defect that the cured inks are easily peeled off from the recording medium (i.e. their adhesion is weak) due to large volume shrinkage.

Epoxy based and oxetane based compounds have been proposed to solve this problem. That is, these compounds have the advantages of the volume shrinkage smaller than that of the radical polymerization and excelling in adhesion because they are cationically polymerizable (see J.P. KOKAI No. 2004-323642). However, they have the faults that their polymerization speed is small and they are expensive at the same time. Thus, it is a current state that there is no polymeric compound that satisfies all the above-mentioned demand performances.

SUMMARY OF THE INVENTION

Therefore, the purpose of the present invention is to provide an ink for use in inkjet printing, which has an excellent adhesion between the ink cured by irradiation of radiant ray and a printing medium, as well as a lithographic printing plate using it and a method for making such plate.

This invention is as follows:
(1) An ink for use in inkjet printing which can be cured by irradiation of radiant ray, comprising at least a colorant, a polymerizable compound and a photopolymerization initiator, and further comprising a compound capable of forming a complex with a metal.
(2) A method for making a lithographic printing plate, comprising ejecting the ink for use in inkjet printing described above in (1) onto a hydrophilic substrate, followed by irradiation of radiant ray to form a hydrophobic image on it by curing to make a lithographic printing plate that doesn't need a development process.
(3) A lithographic printing plate that doesn't need a development process, wherein said plate has a hydrophobic image formed from the ink for use in inkjet printing described above in (1) on a hydrophilic substrate.

EFFECT OF THE INVENTION

The ink according to the present invention which contains a compound capable of forming a complex with a metal as a component of a radiation curable type ink remarkably improves the adhesion with the recording medium (especially, metal plate).

Moreover, the use of the ink of the present invention may result in an effect that any ink blot is not seen in the image printed on the substrate at all, and such an effect of prevention of the ink blot can be not expected from prior arts at all.

BEST MODE FOR CARRYING OUT THE INVENTION

The ink composition according to the present invention can be cured by irradiation of radiant ray, and contains a colorant, a polymerizable compound and a polymerization initiator, and besides a compound capable of forming a complex with a metal. As used herein, the term "radiant ray" widely refers to α-ray, γ-ray, X-ray, ultraviolet-ray, visible light ray, and electron beams, etc. Preferably, the purpose of the present invention is to provide an ink composition that can be cured by irradiation of ultraviolet-ray and electron beams, especially ultraviolet-ray.

(Polymerizable Compounds)

The polymerizable compounds used for the ink of this invention are described below in detail. Polymerizable compounds include well-known radically polymerizable compounds, or ionically polymerizable compounds such as cationically polymerizable compounds. The radically polymerizable compounds include, for example, addition polymerizable compounds having ethylenically unsaturated bonds as follows.

(Addition Polymerizable Compounds having Ethylenically Unsaturated Bonds)

Addition polymerizable compounds having ethylenically unsaturated bonds used in the ink according to the present invention include, for example, esters of unsaturated carboxylic acid (for example, acrylic acid, methacrylic acid, itaconic acid, crotonic acid, isocrotonic acid, maleic acid and the like) and aliphatic polyalcohol compound, and amides of said unsaturated carboxylic acid and aliphatic polyamine compound, etc.

Examples of ester monomer of aliphatic polyalcohol and unsaturated carboxylic acid include acrylic acid ester such as ethyleneglycol diacrylate, triethyleneglycol diacrylate, 1,3-butanediol diacrylate, tetramethyleneglycol diacrylate, propyleneglycol diacrylate, neopentylglycol diacrylate, trimethylolpropane triacrylate, trimethylolpropane tri(acryloyloxypropyl) ether, trimethylolethane triacrylate, hexanediol diacrylate, 1,4-cyclohexanediol diacrylate, tetraethyleneglycol diacrylate, pentaerythritol diacrylate, pentaerythritol triacrylate, pentaerythritol tetraacrylate, dipentaerythritol diacrylate, dipentaerythritol hexaacrylate, sorbitol triacrylate, sorbitol tetraacrylate, sorbitol pentaacrylate, sorbitol hexaacrylate, tri(acryloyloxyethyl) isocyanurate, polyester acrylate oligomer and the like.

Examples of methacrylic acid ester include tetramethyleneglycol dimethacrylate, triethyleneglycol dimethacrylate, neopentylglycol dimethacrylate, trimethylolpropane trimethacrylate, trimethylolethane trimethacrylate, ethyleneglycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis[p-(3-methacryloxy-2-hydroxypropoxy)phenyl]dimethylmethane, bis-[p-(acryloxyethoxy)phenyl]dimethylmethane and the like. Examples of itaconic acid ester include ethyleneglycol diitaconate, propyleneglycol diitaconate, 1,3-butanediol diitaconate, 1,4-butanediol diitaconate, tetramethyleneglycol diitaconate, pentaerythritol diitaconate, sorbitol tetraitaconate and the like.

Examples of crotonic acid ester include ethyleneglycol dicrotonate, tetramethyleneglycol dicrotonate, pentaerythritol dicrotonate, sorbitol tetradicrotonate and the like. Examples of isocrotonic acid ester include ethyleneglycol diisocrotonate, pentaerythritol diisocrotonate, sorbitol tetraisocrotonate and the like. Examples of maleic acid ester include ethyleneglycol dimaleate, triethyleneglycol dimaleate, pentaerythritol dimaleate, sorbitol tetramaleate and the like. In addition, ester monomers described above can be used as a mixture. Moreover, specific examples of amide monomer of aliphatic polyamine compound and unsaturated carboxylic acid include methylenebis-acrylamide, methylenebis-methacrylamide, 1,6-hexamethylenebis-acrylamide, 1,6-hexamethylenebis-methacrylamide, diethylenetriamine trisacrylamide, xylylenebisacrylamide, xylylenebismethacrylamide and the like.

Other examples includes vinylurethane compound comprising two or more polymerizable vinyl groups in a molecule, prepared by an addition reaction of a vinyl monomer having a hydroxyl group represented by the following general formula (A) with a polyisocyanate compound having two or more isocyanate groups as disclosed in Japanese Patent Publication for Opposition Purpose (hereunder referred to as "J.P. KOKOKU") No. Sho 48-41708.

$$CH_2=C(R)COOCH_2CH(R')OH \qquad (A)$$

wherein R and R' each represents H or $CH_3$.

Also, urethane acrylates as described in J.P. KOKAI No. Sho 51-37193, polyester acrylates as described in J.P. KOKAI No. Sho 48-64183, J.P. KOKOKU No. Sho 49-43191, and J.P. KOKOKU No. Sho 52-30490, and polyfunctional acrylates or methacrylates such as epoxyacrylate prepared from epoxy resin and (meth)acrylic acid can be included. In addition, those disclosed in the Bulletin of Japan Adhesion Association (Nihon Settyaku Kyoukai-si) vol. 20, No. 7, pages 300 to 308 (1984) as photo-curable monomer or oligomer can be used. In the present invention, these monomers may be used in the chemical form of prepolymer such as dimer, trimer and oligomer, or a mixture thereof as well as a copolymer thereof.

Besides, an α-hetero type monomer having the structure represented by the general formula (I) as described in the specification of Japanese Patent Application No. Hei 11-268842 (J.P. KOKAI No. 2001-092127) can be preferably utilized. Specific examples of α-hetero type monomer are shown below.

TABLE 1 i) Monofunctional type
(Group A)

General formula

| No. | $X^1$ | $X^2$ |
|---|---|---|
| A-1 | OH | $OCH_3$ |
| A-2 | OH | $O(n)C_4H_9$ |
| A-3 | OH | $O(n)C_{12}H_{25}$ |
| A-4 | OH | 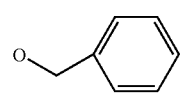 |
| A-5 | OH | 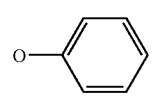 |

TABLE 1-continued i) Monofunctional type
(Group A)

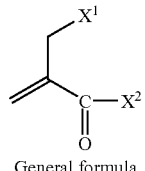

General formula

| No. | X$^1$ | X$^2$ |
|---|---|---|
| A-6 | OH | O-CH$_2$-CH=CH$_2$ (O-allyl) |
| A-7 | OH | O-(4-tert-butylphenyl) |
| A-8 | OCH$_3$ | OC$_2$H$_5$ |
| A-9 | O-iPr | O(n)C$_4$H$_9$ |
| A-10 | O(n)C$_8$H$_{17}$ | OCH$_3$ |
| A-11 | O-CH$_2$-CH=CH$_2$ | O-CH$_2$-CH=CH$_2$ |
| A-12 | O-CH$_2$-C$_6$H$_5$ | OCH$_3$ |
| A-13 | O-C$_6$H$_5$ | OCH$_3$ |
| A-14 | O-CH$_2$CH$_2$-Cl | OCH$_3$ |
| A-15 | O-CH$_2$CH$_2$-OCOCH$_3$ | OC$_2$H$_5$ |
| A-16 | O-(CH$_2$)$_4$-CN | OC$_2$H$_5$ |
| A-17 | OCOCH$_3$ | OCH$_3$ |
| A-18 | OCO(n)C$_6$H$_{13}$ | OCH$_3$ |
| A-19 | OCO-C$_6$H$_5$ | OCH$_3$ |
| A-20 | OSO$_2$CH$_3$ | OCH$_3$ |
| A-21 | OSO$_2$(n)C$_4$H$_9$ | OCH$_3$ |
| A-22 | OSO$_2$-C$_6$H$_4$-CH$_3$ (p-tolyl) | OCH$_3$ |
| A-23 | OSO$_2$CF$_3$ | OCH$_3$ |
| A-24 | SCH$_3$ | OC$_2$H$_5$ |
| A-25 | S(n)C$_4$H$_9$ | OC$_2$H$_5$ |
| A-26 | S-C$_6$H$_5$ | OC$_2$H$_5$ |

TABLE 1-continued i) Monofunctional type
(Group A)

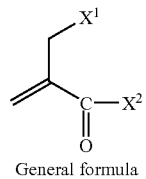

General formula

| No. | X$^1$ | X$^2$ |
|---|---|---|
| A-27 | 2-benzothiazolyl-S- | OCH$_3$ |
| A-28 | 6-chlorobenzoxazol-2-yl-S- | OCH$_3$ |
| A-29 | F | O(n)C$_{13}$H$_{25}$ |
| A-30 | F | O-CH$_2$-C$_6$H$_5$ |
| A-31 | Cl | OCH$_3$ |
| A-32 | Cl | O-(4-(1,1,3,3-tetramethylbutyl)phenyl) |
| A-33 | Br | O(n)C$_4$H$_9$ |
| A-34 | Br | O-CH(C$_2$H$_5$)-C$_4$H$_9$ |
| A-35 | I | O(n)C$_4$H$_9$ |
| A-36 | I | O-CH$_2$CH$_2$-C$_6$H$_5$ |
| A-37 | N(CH$_3$)$_2$ | OC$_2$H$_5$ |
| A-38 | morpholino | OC$_2$H$_5$ |
| A-39 | pyrrolidin-1-yl | OC$_2$H$_5$ |
| A-40 | thiomorpholino | OC$_2$H$_5$ |
| A-41 | 4-(ethoxycarbonyl)piperidin-1-yl | OC$_2$H$_5$ |

TABLE 1-continued i) Monofunctional type
(Group A)

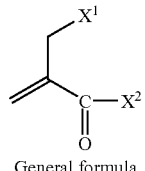

General formula

| No. | X¹ | X² |
|-----|-----|-----|
| A-42 | ![N(CH3)(CH2Ph)] N-benzyl-N-methylamino | OC$_2$H$_5$ |
| A-43 | N(CH$_2$CH$_2$OH)$_2$ | OC$_2$H$_5$ |
| A-44 | N(C$_6$H$_5$)$_2$ | OC$_2$H$_5$ |
| A-45 | N(CH$_2$CH=CH$_2$)$_2$ | OC$_2$H$_5$ |
| A-46 | NHCOCH$_3$ | OCH$_3$ |
| A-47 | NHCO(n)C$_4$H$_9$ | O(n)C$_4$H$_9$ |
| A-48 | N(COCH$_3$)(CH$_3$) | OCH$_3$ |
| A-49 | NHSO$_2$CH$_3$ | O(n)C$_4$H$_9$ |
| A-50 | NHSO$_2$-C$_6$H$_4$-CH$_3$ | O(n)C$_4$H$_9$ |
| A-51 | OCOCH$_3$ | OCH$_2$CH$_2$OH |
| A-52 | OCOCH$_3$ | O(CH$_2$)$_4$OCH$_3$ |
| A-53 | OCOCH$_3$ | OCH$_2$CH$_2$Cl |
| A-54 | OCOCH$_3$ | OCH$_2$CH$_2$N$^+$(CH$_3$)$_3$ Cl$^-$ |
| A-55 | OCOCH$_3$ | OCH$_2$CH$_2$N$^+$(CH$_3$)$_3$ PF$_6^-$ |
| A-56 | OCOC$_2$H$_5$ | O(CH$_2$)$_6$OCOCH$_3$ |

TABLE 1-continued i) Monofunctional type
(Group A)

General formula:

$$\underset{O}{\overset{X^1}{\underset{\|}{CH_2=C-C-X^2}}}$$

| No. | $X^1$ | $X^2$ |
|---|---|---|
| A-57 | $OCOC_2H_5$ | $-O-CH_2CH_2CH_2-OSO_2-C_6H_4-CH_3$ (p-tolyl) |
| A-58 | $OCOC_2H_5$ | $-O-$(cyclohexyl)$-OH$ |
| A-60 | $-N(SO_2C_2H_5)(C_2H_5)$ | $OCH_3$ |
| A-70 | $OCOCH_3$ | $-O-CH_2CH_2CH_2-PO_3H_2$ |
| A-71 | $OCOCH_3$ | $-O-CH_2CH_2CH_2-OPO_3H_2$ |
| A-72 | $OCOCH_3$ | $-O-CH_2CH_2CH_2-CO_2H$ |
| A-73 | $-O-CH_2-C_6H_5$ | $OH$ |
| A-74 | $-O-CH_2-C_6H_5$ | $O^{\ominus}Na^{\oplus}$ |
| A-75 | $-O-CH_2-C_6H_5$ | $-O-CH_2CH_2CH_2-SO_3H$ |
| A-76 | $-O-CH_2-C_6H_5$ | $-O-CH_2CH_2CH_2-SO_3^{\ominus}K^{\oplus}$ |
| A-77 | $-O-CH_2-CH=CH_2$ | $-O-CH_2CH_2CH_2CH_2-PO_3(C_2H_5)_2$ |
| A-78 | $-O-CH_2-CH=CH_2$ | $-O-CH_2CH_2CH_2CH_2-SO_3-$(cyclohexyl) |
| A-79 | $OH$ | $OC_2H_5$ |
| A-80 | $-O-CH_2CH_2-O-CH_2CH_2-OCH_3$ | |
| A-81 | $-OCONH-C_6H_5$ | $OCH_3$ |

TABLE 1-continued
i) Monofunctional type
(Group A)
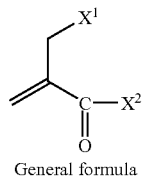
General formula
| No. | X¹ | X² |
|---|---|---|
| A-82 | OCONHSO$_2$—C$_6$H$_4$— | OCH$_3$ |
| A-83 | NHCONH—C$_6$H$_5$ | OCH$_3$ |
| A-84 | NHCO$_2$(n)C$_6$H$_{13}$ | OCH$_3$ |
| A-85 | OCSNH(n)C$_4$H$_9$ | OCH$_3$ |
TABLE 2
(Group B)
B-1 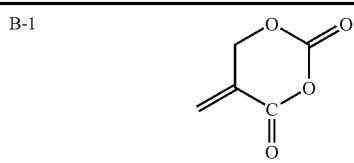
B-2 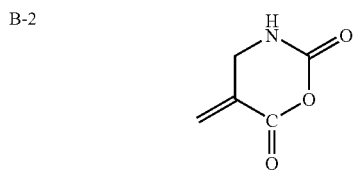
B-3 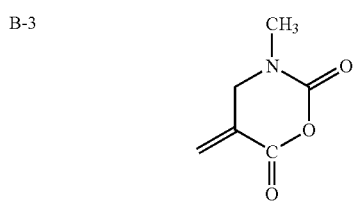
B-4 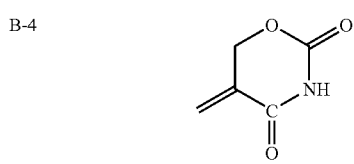
B-5 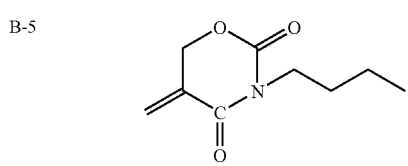
TABLE 2-continued
(Group B)
B-6 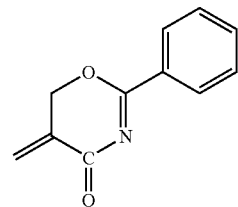
B-7 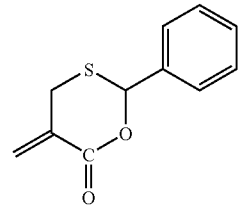
B-8 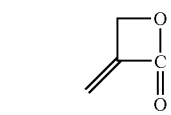
B-9 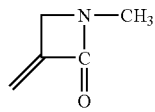

TABLE 3
ii) Difunctional
(Group C)
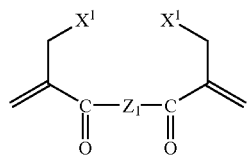
| No. | X¹ | Z¹ |
|---|---|---|
| C-1 | OH | O-(CH2)5-O |
| C-2 | OH | O-(CH2)11-O |
| C-3 | OCOCH₃ | O-CH2CH2-O-CH2CH2-O-CH2CH2-O |
| C-4 | OCOCH₃ | O-CH2CH2-(O-CH2CH2)21-O (Mean number) |
| C-5 | OH | O-CH2-C6H4-CH2-O |
| C-6 | OH | O-C6H4-O (para) |
| C-7 | OH | O-C6H4-C(CH3)2-C6H4-O |
| C-8 | OH | O-C6H4-O-C6H4-O |
| C-9 | OCH₃ | O-C6H4-S-C6H4-O |
| C-10 | OCH2C6H5 | O-C6H4-SO2-C6H4-O |
| C-11 | OCOC₂H₅ | O-C6H4-O (ortho) |
| C-12 | OCOC₂H₅ | O-C6H4-O (meta) |
| C-13 | OH | O-CH2CH2-OC(O)-(CH2)5-C(O)O-CH2CH2-O |

TABLE 3-continued
ii) Difunctional
(Group C)
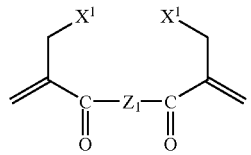
| No. | X¹ | Z¹ |
|---|---|---|
| C-14 | OCOCH₃ | (structure) |
| C-15 | OCO-benzyl | (structure) |
| C-16 | OH | (structure, mean number 20) |
| C-17 | OH | (structure) |
| C-18 | OH | (structure) |
| C-19 | OCOCH₃ | (structure) |
| C-20 | OCOCH₃ | (structure) |
| C-21 | OCO(n)Pr | (structure) |
| C-22 | OCO(n)Pr | (structure) |
| C-23 | OCO-phenyl | (structure) |
| C-24 | SCH₃ | (structure) |
| C-25 | S-benzothiazolyl | (structure) |
| C-26 | SCOCH₃ | (structure) |

TABLE 3-continued ii) Difunctional
(Group C)

| No. | X¹ | Z¹ |
|---|---|---|
| C-27 | OSO₂CH₃ | [pentaerythritol-derived structure with three OH groups and linking O] |
| C-28 | [tolyl-OSO₂-] | [2-chloro-1,4-phenylene dioxy] |
| C-29 | N(CH₃)₂ | [1,4-phenylene dioxy] |
| C-30 | morpholino (N-linked) | [−O−(CH₂)₄−O−] |
| C-31 | piperidino (N-linked) | [1,3-phenylene with NHSO₂− and −SO₂NH−] |
| C-32 | F | [−O−(CH₂)₄−O−] |
| C-33 | NHCOCH₃ | piperazine (N,N'-linked) |
| C-34 | [tolyl-NHSO₂-] | [HN−(CH₂)₄−NH] |
| C-35 | [phenyl-NHCO₂-] | [NH−CH₂CH₂−O−CH₂CH₂−O−CH₂CH₂−NH] |

TABLE 4

(Group D)

| No. | X¹ | Z¹ |
|---|---|---|
| D-1 | OCH₃ | [−O−(CH₂)₆−O−] |

TABLE 4-continued (Group D)

$$\text{CH}_2=\text{C}(\text{COX}^2)-\text{CH}_2-Z^2-\text{CH}_2-\text{C}(\text{COX}^2)=\text{CH}_2$$

| No. | $X^1$ | $Z^1$ |
|---|---|---|
| D-2 | OCH₃ | —O—(CH₂)₁₀—O— |
| D-3 | OC₂H₅ | —O—CH₂CH₂—O—CH₂CH₂—O—CH₂CH₂—O— |
| D-4 | OC₂H₅ | —O—CH₂CH₂—(O—CH₂CH₂)₂₁—O— (Mean number) |
| D-5 | O—CH₂—CH=CH₂ | —O—CH₂—(p-C₆H₄)—CH₂—O— |
| D-6 | O—CH₂—C₆H₅ | —O—(p-C₆H₄)—O— |
| D-7 | OCH₃ | —OCO—(CH₂)₃—COO— |
| D-8 | OCH₃ | —OCO—(CH₂)₈—COO— |
| D-9 | O(n)C₄H₉ | —OCO—(p-C₆H₄)—COO— |
| D-10 | O(n)C₄H₉ | —OCO—CH₂—(p-C₆H₄)—CH₂—COO— |
| D-11 | O—CH₂CH₂—OCH₃ | —OCO—(1,4-C₆H₁₀)—COO— |
| D-12 | O—CH₂CH₂—N(CH₃)₂ | —OCONH—(CH₂)₆—NHCOO— |
| D-13 | OCH₃ | —OCONH—(m-C₆H₄)—NHCOO— |
| D-14 | OCH₃ | —OCONH—(p-C₆H₄)—C(CH₃)₂—(p-C₆H₄)—NHCOO— |
| D-15 | OCH₃ | —OSO₂—(CH₂)₄—SO₂O— |

TABLE 4-continued (Group D)

$$\text{structure with } Z^2 \text{ bridging two } \text{CH}_2\text{=C(COX}^2\text{)CH}_2\text{– groups}$$

| No. | $X^1$ | $Z^1$ |
|---|---|---|
| D-16 | O(n)C$_{12}$H$_{25}$ | trimethylbenzene with OSO$_2$– and –SO$_2$O substituents |
| D-17 | OCH$_3$ | OCO(CH$_2$)$_3$COO(CH$_2$)$_4$OCO(CH$_2$)$_3$COO |
| D-18 | OCH$_3$ | OCO(CH$_2$)$_3$CONH(CH$_2$)$_6$NHCO(CH$_2$)$_3$COO |
| D-19 | OCH$_3$ | OCOCH$_2$CH$_2$CO(OCH$_2$CH$_2$OCO-C$_6$H$_4$-CO)$_{20}$OCH$_2$CH$_2$OCOCH$_2$CH$_2$COO (Mean number) |
| D-20 | OC$_2$H$_5$ | OCOCH$_2$CONH(CH$_2$)$_4$O |
| D-21 | OCH$_3$ | OCO(CH$_2$)$_4$O |
| D-22 | SCH$_3$ | OCO(CH$_2$)$_4$OCO |
| D-23 | S–C$_6$H$_5$ | OCOCH$_2$CH$_2$OCO |
| D-24 | 5-chloro-2-benzothiazolylthio | OCOCH$_2$CH$_2$OCO |
| D-25 | N(CH$_3$)(C$_2$H$_5$) | OCO(CH$_2$)$_4$OCO |
| D-26 | morpholino | OCO(CH$_2$)$_4$OCO |
| D-27 | NH(n)C$_{12}$H$_{26}$ | OCO(CH$_2$)$_5$OCO |
| D-28 | OCH$_3$ | S(CH$_2$)$_6$S |
| D-29 | OCH$_2$CH$_2$OH | S(CH$_2$)$_6$S |
| D-30 | O(CH$_2$)$_4$OCOCH$_3$ | NHCO(CH$_2$)$_5$CONH |

TABLE 4-continued (Group D)

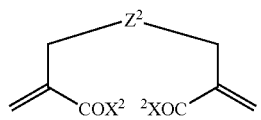

| No. | $X^1$ | $Z^1$ |
|---|---|---|
| D-31 | $OCH_3$ | (N,N'-dimethyl-hexamethylenediamine structure) |
| D-32 | $OCH_3$ | (N,N'-dimethyl terephthalamide structure) |
| D-33 | $OCH_3$ | NHCOO−(CH₂)₄−OCONH |
| D-34 | $OCH_3$ | (naphthalene-1,5-disulfonamide structure) |
| D-35 | $OC_2H_5$ | O |

TABLE 5 iii) Tri- or more functional type
(Group E)

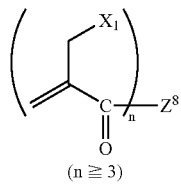

(n ≧ 3)

| No. | $X^1$ | $Z^3$ |
|---|---|---|
| E-1 | OH | (1,3,5-trihydroxybenzene / phloroglucinol core) |
| E-2 | $OCH_3$ | (1,1,1-tris(4-hydroxyphenyl)ethane core) |
| E-3 | $OCOCH_3$ | (pentaerythritol triacetate core) |

TABLE 5-continued
iii) Tri- or more functional type
(Group E)
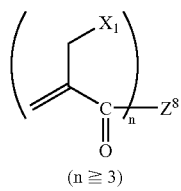
(n ≧ 3)
| No. | X¹ | Z³ |
|---|---|---|
| E-4 | OH | |
| E-5 | OCOCH₃ | |
| E-6 | | |
| E-7 | OH | |
| E-8 | OH | |
| E-9 | OH | |
| E-10 | OCOOH₃ | |
| E-11 | SCH₃ | |

TABLE 5-continued iii) Tri- or more functional type
(Group E)

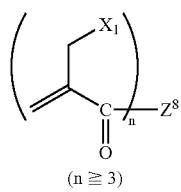

($n \geqq 3$)

| No. | $X^1$ | $Z^3$ |
|---|---|---|
| E-12 | Cl | (pentaerythritol-type tetraester) |
| E-13 | Br | (pentaerythritol-type tetraester) |
| E-14 | N⁺(CH₃)₃ Cl⁻ | (1,3,5-benzenetriol-type triester) |
| E-15 | N(CH₃)₂ | (1,3,5-benzenetriol-type triester) |
| E-16 | morpholino | (pentaerythritol-type tetraester) |
| E-17 | OCO(n)C₁₂H₂₅ | (tris(aminomethyl) triamine) |
| E-18 | S-phenyl | HN-CH₂CH₂-N(CH₂CH₂-NH)- |
| E-19 | SO₂-phenyl | (trimethylolpropane-type with OH) |
| E-20 | OSO₂-C₆H₄-CH₃ | (pentaerythritol-type tetraester) |
| E-21 | NHCOCH₃ | (pentaerythritol-type tetraester) |

TABLE 5-continued
iii) Tri- or more functional type
(Group E)
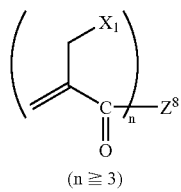
(n ≧ 3)
| No. | X¹ | Z³ |
|---|---|---|
| E-22 | NHSO₂—⟨phenyl⟩— | pentaerythritol tetraester core |
| E-23 | CH₃CH(O—)(OC₂H₅) | pentaerythritol tetraester core |
| E-24 | (CH₃)₃C—O— | pentaerythritol tetraester core |
| E-25 | OH | C(CH₂OCO-CH₂CH₂-S)₄ |
| E-26 | OH | N—(CH₂)₄—N |
TABLE 6
(Group F)
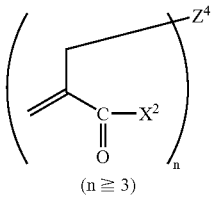
(n ≧ 3)
表-6
| No. | X² | Z⁴ |
|---|---|---|
| F-1 | OH | 1,3,5-trihydroxybenzene (phloroglucinol) |
| F-2 | OCH₃ | pentaerythritol core |

TABLE 6-continued
(Group F)
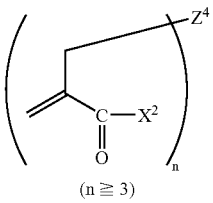
(n ≧ 3)
表-6
| No. | $X^2$ | $Z^4$ |
|---|---|---|
| F-3 | $OCH_3$ | 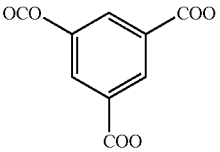 |
| F-4 | $OCH_3$ | 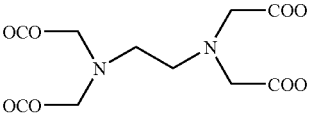 |
| F-5 | $OC_2H_5$ | 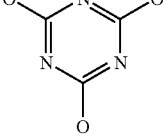 |
| F-6 | $OCH_3$ | 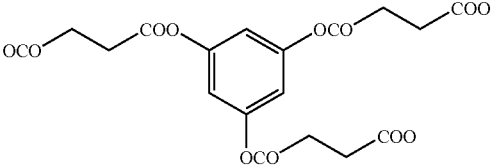 |
| F-7 | $OCH_3$ | 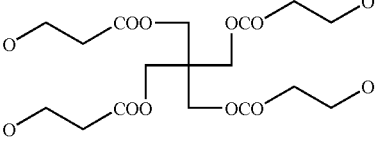 |
| F-8 | $O(n)C_3H_7$ | 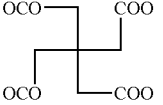 |
| F-9 |  | 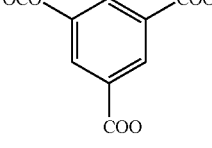 |
| F-10 | $O(n)C_{12}H_{25}$ | 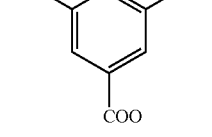 |

TABLE 6-continued
(Group F)
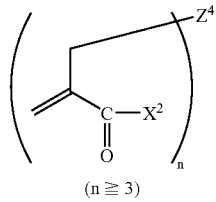
(n ≧ 3)
表-6
| No. | $X^2$ | $Z^4$ |
|---|---|---|
| F-11 | 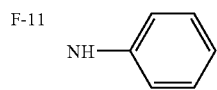 | 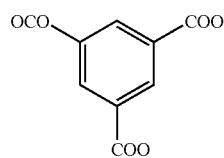 |
| F-12 | NH—(n)C$_4$H$_9$ | 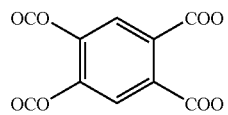 |
| F-13 | Cl | 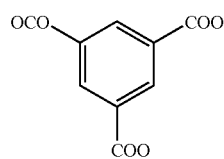 |
| F-14 | O$^\ominus$Na$^\oplus$ | 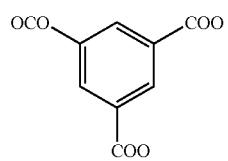 |
| F-15 | 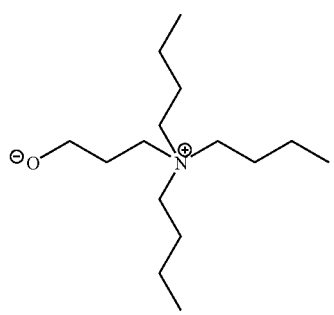 | 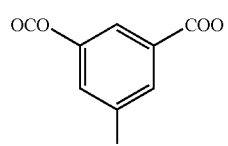 |
| F-16 | OCH$_3$ | 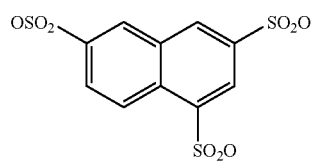 |
| F-17 | OCH$_3$ | 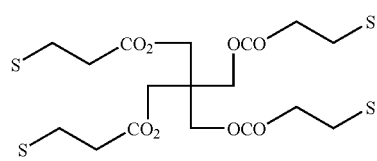 |

TABLE 6-continued
(Group F)
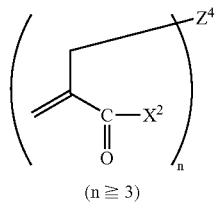
(n ≧ 3)
表-6
| No. | X² | Z⁴ |
|---|---|---|
| F-18 | OCH₃ | 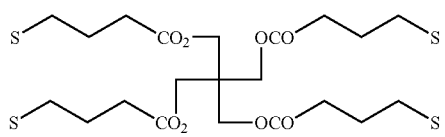 |
| F-19 |  | 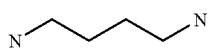 |
| F-20 | 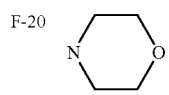 | 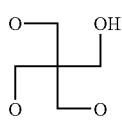 |
| F-21 | OCH₃ | 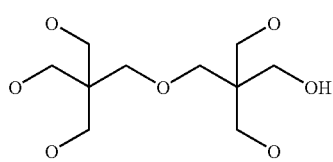 |
| F-22 | 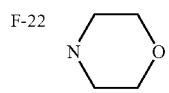 | 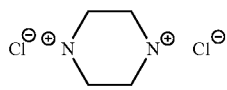 |
TABLE 7
iv) High molecular type
| G-1 | ─(CH₂CH)₈₀─<br>  \|<br>  OCO─⟨⟩─OH | ─(CH₂CH)₁₀─<br>  \|<br>  OH | ─(CH₂CH)₁₀─<br>  \|<br>  OCOCH₃ | Mw 20000 |
|---|---|---|---|---|
| G-2 | ─(CH₂CH)₇₀─<br>  \|<br>  OCO─⟨⟩─OCOCH₃ | ─(CH₂CH)₁₅─<br>  \|<br>  OH | ─(CH₂CH)₁₅─<br>  \|<br>  OCOCH₃ | Mw 15000 |
| G-3 | ─(CH₂CH)₈₀─<br>  \|<br>  CO₂─⟨⟩─OCO─⟨⟩─OCOCH₃ | ─(CH₂CH)₂₀─<br>  \|<br>  CO₂─⟨⟩─OH | ─(CH₂CH)₂₀─<br>  \|<br>  CO₂H | Mw 30000 |

TABLE 7-continued

| | iv) High molecular type | | |
|---|---|---|---|
| G-4 | structure with $-(CH_2C(CH_3))_{75}-$ backbone with $CO_2CH_2CH_2OCO-C(=CH_2)-CH_2OH$ side chain | structure with $-(CH_2C(CH_3))_5-$ with $CO_2CH_2CH_2OH$ and $-(CH_2CH)_{20}-$ with $CO_2H$ | Mw 50000 |
| G-5 | $-(CH_2CH)_{70}-$ with $CO_2CH_2-C(=CH_2)-CO_2CH_3$ | $-(CH_2CH)_{30}-$ with $CO_2H$ | Mw 20000 |
| G-6 | $-(CH_2C(CH_3))_{80}-$ with $CO_2-CH_2-C(=CH_2)-CO_2CH_3$ | $-(CH_2C(CH_3))_{20}-$ with $CO_2H$ | Mw 10000 |
| G-7 | $-(CH_2C(CH_3))_{60}-$ with $CO_2CH_2CH_2OCO-C(=CH_2)-CH_2Cl$ | $-(CH_2C(CH_3))_{40}-$ with $CO_2H$ | Mw 20000 |
| G-8 | $-(CH_2C(CH_3))_{50}-$ with $CO_2CH_2CH_2OCO-C(=CH_2)-CH_2-S-$benzothiazolyl | $-(CH_2CH)_{50}-$ with $CO_2H$ | Mw 20000 |
| G-9 | $-(CH_2CH)_{80}-$ with 4-phenyl-$OCO-C(=CH_2)-CH_2OH$ | $-(CH_2CH)_{20}-$ with 4-hydroxyphenyl | Mw 5000 |
| G-10 | $-(CH_2CH)-$ with 4-phenyl-$OCO-C(=CH_2)-CH_2-S-$(5-NHCOC$_2$H$_5$-benzothiazol-2-yl) | $-(CH_2CH)-$ with 4-hydroxyphenyl | Mw 10000 |

TABLE 7-continued
| iv) High molecular type |
| G-11 | 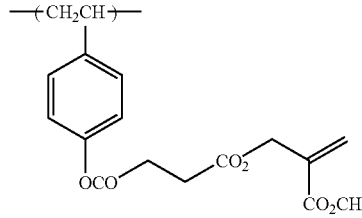 | 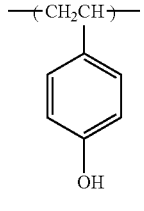 | Mw 10000 |
| G-12 | 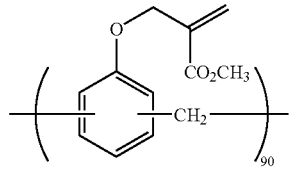 | 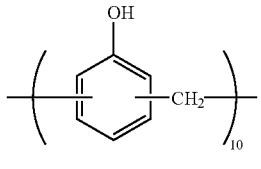 | Mw 5000 |
| G-13 | 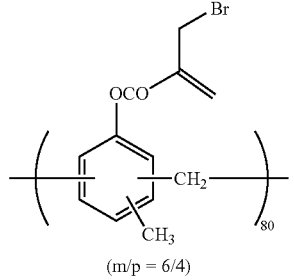 | 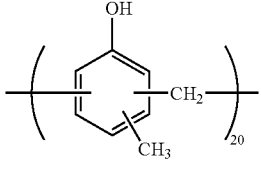 | Mw 7500 |
| G-14 | 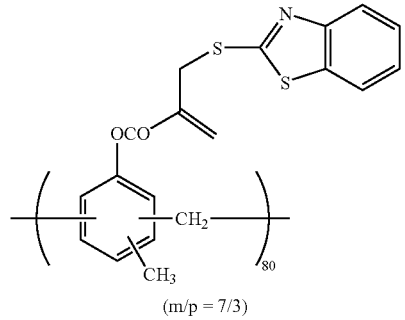 | 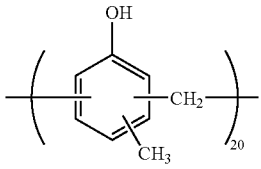 | Mw 4000 |
| G-15 | 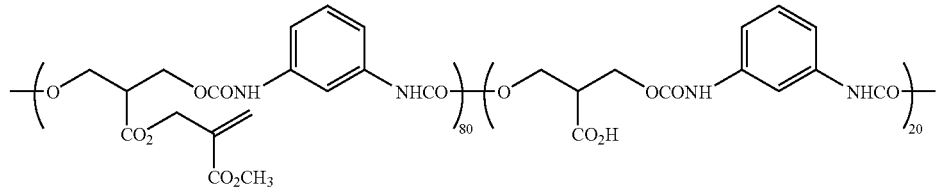 | | Mw 10000 |
| G-16 | 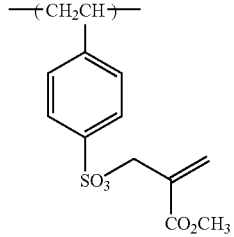 | | Mw 100000 |

TABLE 7-continued
| iv) High molecular type |
| G-17 | 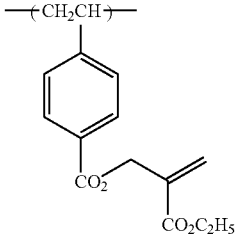 | Mw 15000 |
| G-18 | 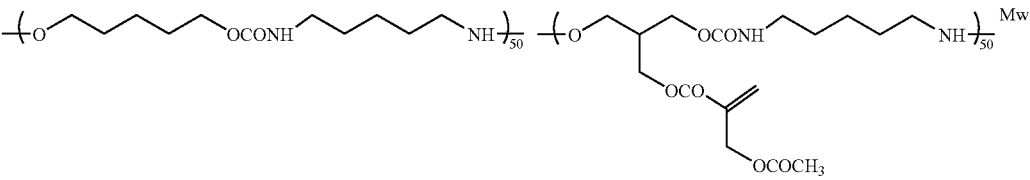 | Mw 20000 |
| G-19 | 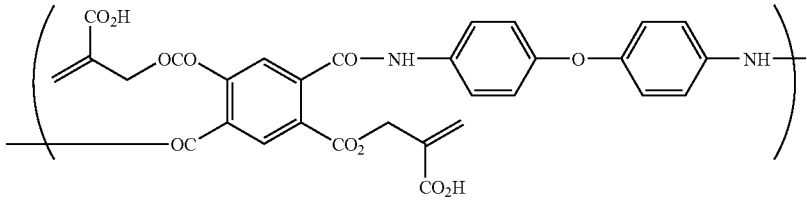 | Mw 15000 |
| G-20 | 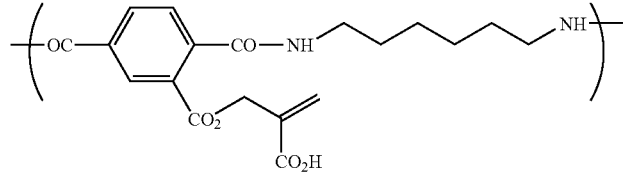 | Mw 5000 |
| G-21 | 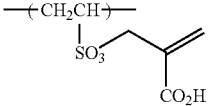 | Mw 20000 |
| G-22 | 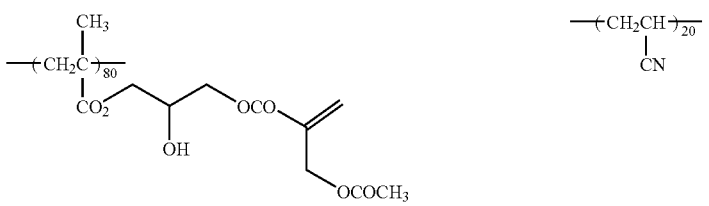 | Mw 30000 |
| G-23 | 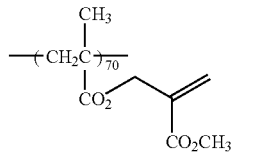 | Mw 30000 |
| G-24 | 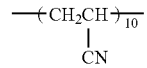 | Mw 20000 |

TABLE 7-continued
iv) High molecular type
| G-25 | 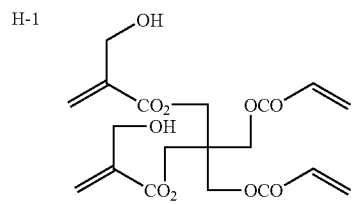 | Mw 15000 |
| G-26 | 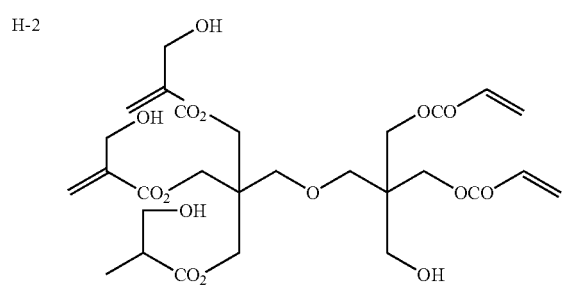 | Mw 10000 |
TABLE 8
v) Others
(Group H)
H-1 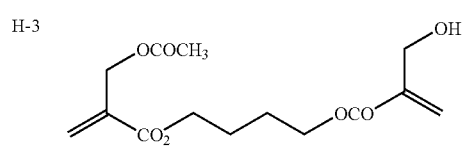
H-4 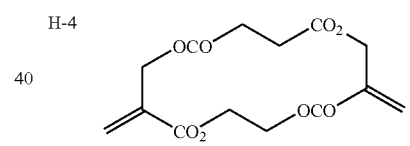
H-5 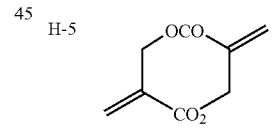
H-2
H-6 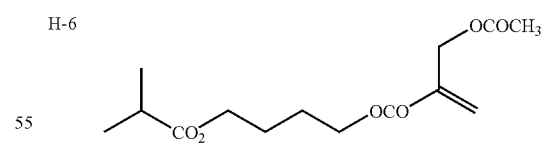
H-7 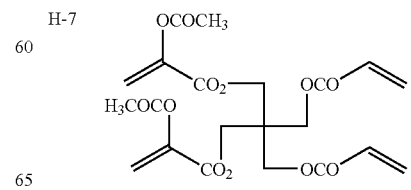
H-3

TABLE 9
(Group J)
J-1
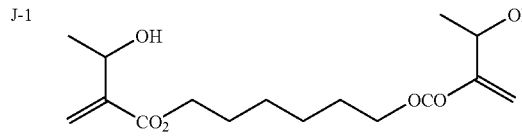
J-2
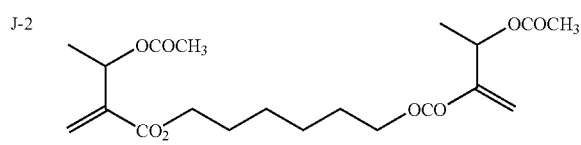
J-3
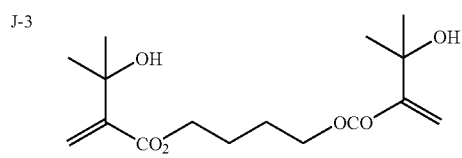
J-4
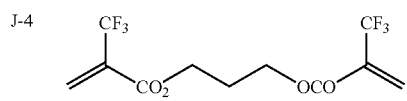
J-5
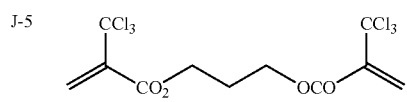
J-6
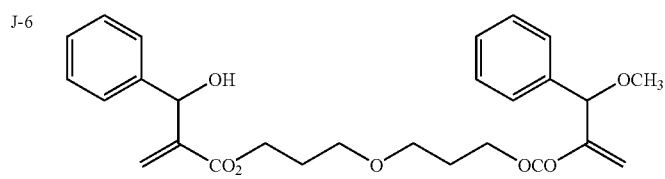
J-7
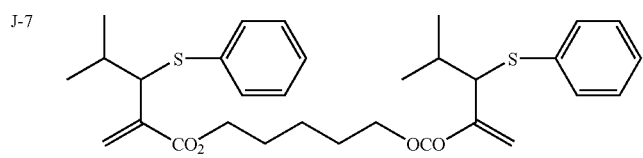
J-8
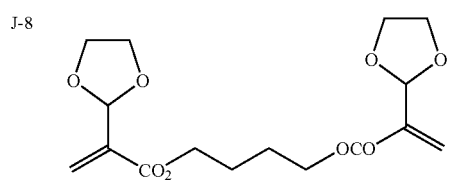
J-9
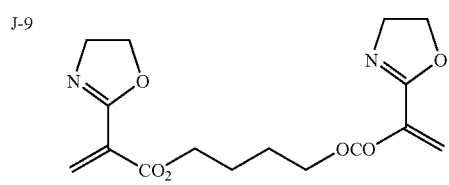
J-10
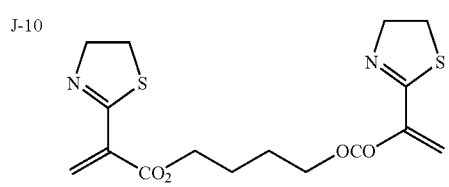

TABLE 9-continued (Group J)

J-11 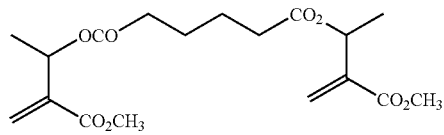

J-12 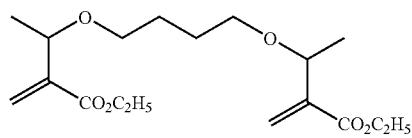

J-13 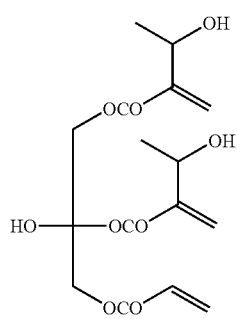

J-14 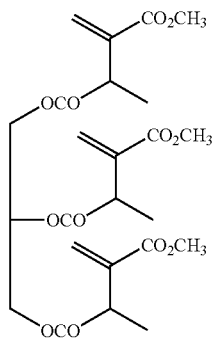

J-15 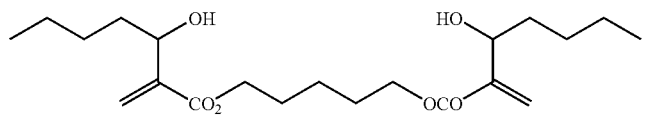

The total amount of polymerizable compounds are generally used in the range of 1% to 99.99% based on the weight of all components of the ink, preferably from 5 to 90.0%, and more preferably from 10 to 70% (as used herein, "%" represents "% by weight").

(Cationically Polymerizable Compounds)

Cationically polymerizable compounds used in the ink according to the present invention, as described below, include compounds having one or more oxirane groups in a molecule, vinyl ether compounds, oxetane compounds having an oxetane ring and one hydroxyl group in a molecule and the like.

Compounds having one or more oxirane groups in a molecule, which may be monomer and oligomer thereof, can be used. Specifically, such compounds include conventionally known aromatic epoxides, alicyclic epoxides, aliphatic epoxides and the like. The term "epoxide" hereinafter referred to monomer or oligomer thereof. Oligomers in the present invention are preferably compounds having low molecular weight, more preferably oligomers having molecular weight less than 1000.

The preferred aromatic epoxides are di- or polyglycidyl ethers prepared by the reaction between polyhydric phenol having at least one aromatic nucleus or alkylene oxide adduct thereof and epichlorohydrin, including for example, di- or polyglycidyl ethers of bisphenol A or alkylene oxide adduct thereof, di- or polyglycidyl ethers of hydrogenated bisphenol A or alkylene oxide adduct thereof, novolac type epoxy resin and the like. Here, alkylene oxids include ethylene oxide, propylene oxide and the like.

Alicyclic epoxides are preferably cyclohexene oxide or cyclopentene oxide-containing compounds which are produced by epoxidizing a compound having at least one cycloalkane ring such as cyclohexene or cyclopentene ring, etc. with an appropriate oxdizng agent such as hydrogen peroxide, peracid, etc. Specific examples include compounds shown below.

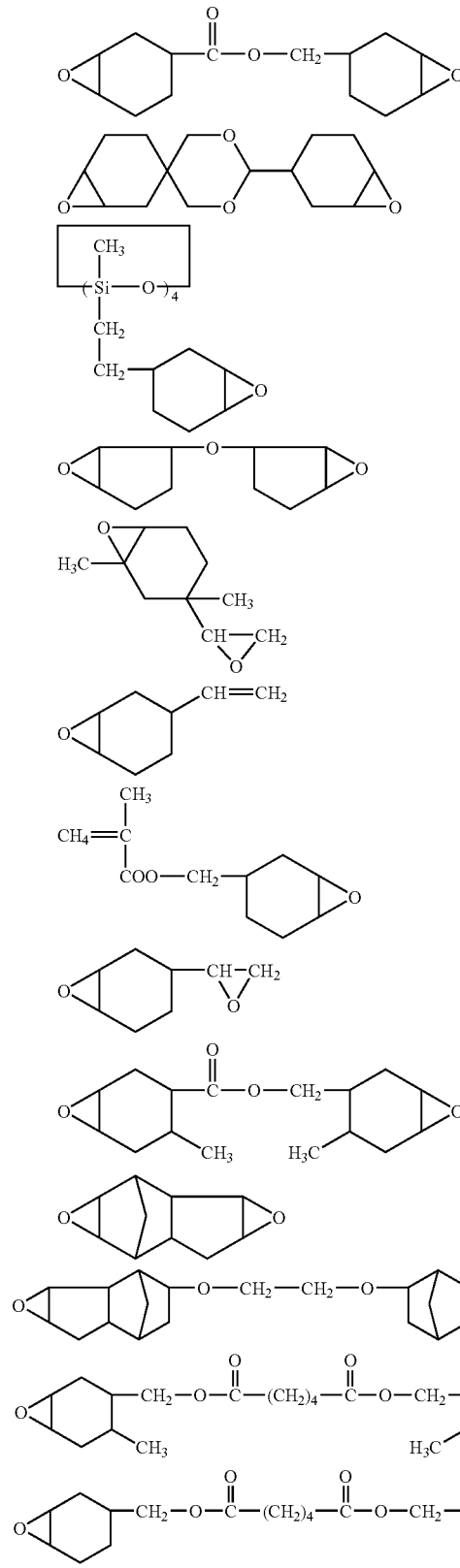

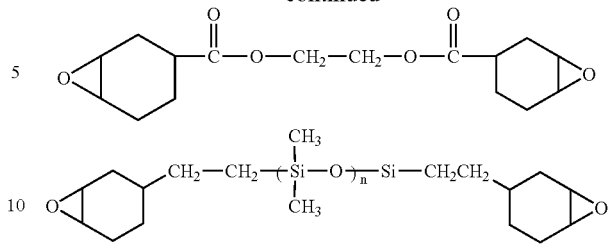

The preferred aliphatic epoxides include di- or polyglycidyl ethers of aliphatic polyhydric alcohol or alkylene oxide adduct thereof and the like. Representative examples such compounds include diglycidyl ethers of alkylene glycols such as diglycidyl ether of ethylene glycol, diglycidyl ether of propylene glycol or diglycidyl ether of 1,6-hexanediol, etc.; polyglycidyl ethers of polyhydric alcohol such as di- or triglycidyl ethers of glycerine or alkylene oxide adduct thereof, etc.; diglycidyl ethers of polyalkylene glycols such as diglycidyl ethers of polyethylene glycol or alkylene oxide adduct thereof, diglycidyl ethers of polypropylene glycol or alkylene oxide adduct thereof, etc. Here, alkylene oxids include ethylene oxide, propylene oxide and the like.

In addition to these compounds, monomers having one oxirane group in a molecule, which are monoglycidyl ethers of higher aliphatic alcohols and monoglycidyl ethers of phenol and cresol, etc. can be used. Among these epoxides, considering quick curability, aromatic epoxides and alicyclic epoxides are preferable, particularly alicyclic epoxides are preferable. In the present invention, one of epoxides described above can be used alone or an appropriate combination of two or more epoxides may be used.

Vinyl ether compounds as cationically polymerizable compounds include, for example, di- or trivinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, trimethylolpropane trivinyl ether, etc.; monovinyl ether compounds such as ethyl vinyl ether, n-butyl vinyl ether, iso-butyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, iso-propyl vinyl ether, iso-propenylether-O-propylene carbonate, dodecyl vinyl ether, diethylene glycol monovinyl ether, octadecyl vinyl ether and the like.

Among these vinyl ether compounds, considering curability, adhesion and surface hardness, di- or trivinyl ether compounds are preferable, particularly divinyl ether compounds are preferable. In the present invention, one of vinyl ether compounds described above can be used alone or an appropriate combination of two or more vinyl ether compounds may be used.

Compounds having an oxetane ring and one hydroxyl group as cationically polymerizable compounds include, for example, compounds represented by the following formula.

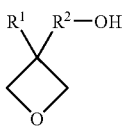

In the avobe formula, R¹ is a hydrogen atom, a linear or branched alkyl group with 1 to 6 carbon atoms such as methyl group, ethyl group, propyl group, butyl group, etc., fluoroalkyl group with 1 to 6 carbon atoms, allyl group, aryl group, furyl group or thienyl group. R² is a linear or branched alkylene group with 1 to 6 carbon atoms such as methylene, ethylene, propylene or butylene group, etc., wherein such alkylene group may be a group having an ether bond, for example, oxyalkylene group such as oxymethylene, oxyethylene, oxypropylene, oxybutylene, etc. Among these compounds, considering quick curability, adhesion and surface hardness, preferred R¹ in the above formula is alkyl group with 1 to 6 carbon atoms, particularly alkyl group with 1 to 3 carbon atoms. Also, preferred R² is hydroxyalkyl group with 1 to 6 carbon atoms, particularly hydroxyalkyl group with 1 to 3 carbon atoms.

Specific examples of the compounds represented by the above formula include 3-hydroxymethyl-3-methyloxetane, 3-hydroxymethyl-3-ethyloxetane, 3-hydroxymethyl-3-propyloxetane, 3-hydroxymethyl-3-normalbutyloxetane, 3-hydroxymethyl-3-phenyloxetane, 3-hydroxymethyl-3-benzyloxetane, 3-hydroxyethyl-3-methyloxetane, 3-hydroxyethyl-3-ethyloxetane, 3-hydroxyethyl-3-propyloxetane, 3-hydroxyethyl-3-phenyloxetane, 3-hydroxypropyl-3-methyloxetane, 3-hydroxypropyl-3-ethyloxetane, 3-hydroxypropyl-3-propyloxetane, 3-hydroxypropyl-3-phenyloxetane, 3-hydroxybutyl-3-methyloxetane and the like. Among these compounds, in terms of easiness of obtaining, etc., as oxetane monoalcohol compounds, 3-hydroxymethyl-3-methyloxetane and 3-hydroxymethyl-3-ethyloxetane are preferable.

(Photopolymerization Initiator)

Next, photopolymerization initiator used for the ink of the present invention, particularly photopolymerization initiator for radical polymerization or cationic polymerization is described.

Photopolymerization initiator in the present invention is a compound which may cause a chemical transformation via a photo-action or via the interaction with electrons of sensitizing dye exited to produce at least one of radical, acid and base.

Any specific photopolymerization initiators known to person skilled in the art can be used without limitation, and specifically, for example, described frequently in Bruce M. Monroe et al., Chemical Revue, 93, 435 (1993), R. S. Davidson, Journal of Photochemistry and biology A: Chemistry, 73.81 (1993), J. P. Faussier "Photoinitiated Polymerization-Theory and Applications": Rapra Review vol. 9, Report, Rapra Technology (1998), M. Tsunooka et al., Prog. Polym. Sci., 21, 1 (1996). Moreover, many compounds utilized in chemical amplification type photoresist and photo-cationic polymerization are described (see Society for Organic Electronics Materials, ed., "Organic Materials for Imaging", Bunshin Syuppan (1993), 187-192). In addition, the compounds which may oxidatively or reductively produce the cleavage of bonds via the interaction with electrons of sensitizing dye exited, as described in F. D. Saeva, Topics in Current Chemistry, 156,59 (1990), G. G. Maslak, Topics in Current Chemistry, 168, 1 (1993), H. B. Shuster et al, JACS, 112, 6329 (1-990), 1. D. F. Eaton et al, JACS, 102, 3298 (1980) have been known.

Preferred photopolymerization initiators include, (a) aromatic ketones, (b) aromatic onium salt compounds, (c) organic peroxides, (d) hexaarylbiimidazole compounds, (e) ketoxime ester compounds, (f) borate compounds, (g) azinium compounds, (h) metallocene compounds, (j) active ester compounds, (i) compounds having carbon-halogen bond and the like.

Preferred examples of (a) aromatic ketones, include compounds having benzophenone skeleton or thioxanthone skeleton described in "RADIATION CURING IN POLYMER SCIENCE AND TECHNOLOGY", J. P. FOUASSIER J. F. RABEK (1993), p. 77-117, etc. More preferable examples of (a) aromatic ketones include α-thiobenzophenone compounds described in J.P. KOKOKU No. Sho 47-6416, benzoin ether compounds described in J.P. KOKOKU No. Sho 47-3981, α-substituted benzoin compounds described in J.P. KOKOKU No. Sho 47-22326, benzoin derivatives described in J.P. KOKOKU No. Sho 47-23664, aroyl phosphonate esters described in J.P. KOKAI No. Sho 57-30704, dialkoxy benzophenones described in J.P. KOKOKU No. Sho 60-26483, benzoin ethers described in J.P. KOKOKU No. Sho 60-26403 and J.P. KOKAI No. Sho 62-81345, α-aminobenzophenones described in J.P. KOKOKU No. Hei 1-34242, U.S. Pat. No. 4,318,791 and E.P No. 0284561A1, p-di(dimethylaminobenzoyl)benzene described in J.P. KOKAI No. Hei 2-211452, thio-substituted aromatic ketones described in J.P. KOKAI No. Sho 61-194062, acylphosphine sulfides described in J.P. KOKOKU No. Hei 2-9597, acylphosphines described in J.P. KOKOKU No. Hei 2-9596, thioxanthones described in J.P. KOKOKU No. Sho 63-61950, coumarins described in J.P. KOKOKU No. Sho 59-42864, etc.

Examples of (b) aromatic onium salts include aromatic onium salts of elements of V, VI and VII group in periodic table, specifically N, P, As, Sb, Bi, O, S, Se, Te, or I. For example, iodonium salts described in E.P. No. 104143, U.S. Pat. No. 4,837,124, J.P. KOKAI No. Hei 2150848 and J.P. KOKAI No. Hei 2-96514, sulfonium salts described in E.P. Nos. 370693, 233567, 297443, 297442, 279210 and 422570, U.S. Pat. Nos. 3,902,144, 4,933,377, 4,760,013, 4,734,444 and 2,833,927, diazonium salts (benzene diazonium salts which may have substituents), diazonium salt resins (formaldehyde resins of diazodiphenylamine, etc.), N-alkoxypyridinium salts, etc. (for example, those described in U.S. Pat. No.4,743,528, J.P. KOKAI No. Sho 63138345, J.P. KOKAI No. Sho 63-142345, J.P. KOKAI No. Sho 63-142346 and J.P. KOKOKU No. Sho 46-42363, and specifically 1-methoxy-4-phenylpyridinium tetrafluoroborates, etc.), further compounds described in J.P. KOKAI Nos. Sho 52-147277, 52-14278 and-52-14279 are preferably used. These compounds may produce radicals and acids as active species.

(c) Organic peroxides include most of all organic compounds having one or more oxygen-oxygen bonds in a molecule, and preferred examples are peroxide esters such as 3,3',4,4'-tetra-(t-butylperoxycarbonyl)benzophenone, 3,3',4,4'-tetra-(t-amylperoxycarbonyl)benzophenone, 3,3',4,4'-tetra-(t-hexylperoxycarbonyl)benzophenone, 3,3',4,4'-tetra-(t-octylperoxycarbonyl)benzophenone, 3,3',4,4'-tetra-(t-cumilperoxycarbonyl)benzophenone, 3,3',4,4'-tetra-(p-isopropylcumilperoxycarbonyl)benzophenone, di-t-butylperoxyisophthalate, etc.

(d) Hexaarylbiimidazoles include lophine dimers described in J.P. KOKOKU No. Sho 45-37377 and J.P. KOKOKU No. Sho 44-86516, for example,
2,2'-bis(o-chlorophenyl)-4,4',5,5'-tetraphenylbiimidazole,
2,2'-bis(o-bromophenyl)-4,4',5,5'-tetraphenylbiimidazole,
2,2'-bis(o,p-dichlorophenyl)-4,4',5,5'-tetraphenylbiimidazole,
2,2'-bis(o-chlorophenyl)-4,4',5,5'-tetra(m-methoxyphenyl) biimidazole,
2,2'-bis(o,o'-dichlorophenyl)-4,4',5,5'-tetraphenylbiimidazole, 2,2'-bis(o-nitrophenyl)-4,4',5,5'-tetraphenylbiimidazole,
2,2'-bis(o-methylhenyl)-4,4',5,5'-tetraphenylbiimidazole,
2,2'-bis(o-trifluorophenyl)-4,4',5,5'-tetraphenylbiimidazole, etc.

(e) Ketoxime esters include 3-benzoyloxyiminobutan-2-one,
3-acetoxyiminobutan-2-one, 3-propionyloxyiminobutan-2-one,
2-acetoxyiminopentan-3-one, 2-acetoxyimino-1-phenylpropan-1-one,
2-benzoyloxyimino-1-phenylpropan-1-one, 3-p-toluenesulfonyloxyiminobutan-2-one,
2-ethoxycarbonyloxyimino-1-phenylpropan-1-one, etc.

Other examples of photoplymerization initiators used in the present invention, examples of (f) borate salts include compounds described in U.S. Pat. Nos. 3,567,453 and 4,343,891, E.P Nos. 109,772 and 109,773, etc.

Other examples of photopolymerization initiators used in the present invention, examples of (g) azinium salt compounds, include compounds having N—O bonds described in J.P. KOKAI Nos. Sho 63-138345, Sho 63-142345, Sho 63-142346 and Sho 63-143537, and J.P. KOKOKU No. Sho 46-42363.

Other examples of photopolymerization initiators used in the present invention, examples of (h) metallocene compounds include titanocene compounds described in J.P. KOKAI Nos. Sho 59-152396, Sho 61-151197, Sho 63-41484, Hei 2-249 and Hei 2-4705, as well as iron-arene complexes described in J.P. KOKAI Nos. Hei 1-304453 and Hei 1-152109.

Specific examples of above titanocene compounds include di-cyclopentadienyl-Ti-di-chloride, di-cyclopentadienyl-Ti-bis-phenyl,
di-cyclopentadienyl-Ti-bis-2,3,4,5,6-pentafluorophen-1-yl,
di-cyclopentadienyl-Ti-bis-2,3,5,6-tetrafluorophen-1-yl,
di-cyclopentadienyl-Ti-bis-2,4,6-trifluorophen-1-yl,
di-cyclopentadienyl-Ti-bis-2,6-difluorophen-1-yl,
di-cyclopentadienyl-Ti-bis-2,4-difluorophen-1-yl,
di-methycyclopentadienyl-Ti-bis-2,3,4,5,6-pentafluorophen-1-yl,
di-methycyclopentadienyl-Ti-bis-2,3,5,6-tetrafluorophen-1-yl,
di-methycyclopentadienyl-Ti-bis-2,4-difluorophen-1-yl,
bis(cyclopentadienyl)-bis-(2,6-difluoro-3-(pyr-1-yl)phenyl) titanium,
bis(cyclopentadienyl)bis[2,6-difluoro-3-(methylsulfonamido)phenyl]titanium,
bis(cyclopentadienyl)bis[2,6-difluoro-3-(N-butylbiaroyl-amino)phenyl]titanium, etc.

Examples of (i) active ester compounds include nitrobenzyl ester compounds described in E.P. Nos. 0290750, 046083, 156153, 271851 and 0388343, U.S. Pat. Nos. 3,901,710 and 41815, J.P. KOKAI Nos. Sho 60-198538 and Sho 53-133022, iminosulfonate compounds described in E.P. Nos. 0199672, 84515, 199672, 04415 and 0101122, U.S. Pat. Nos. 4,618,564, 4,371,605 and 4431774, J.P. KOKAI Nos. Sho 64-18143, Hei 2-245756 and Hei 4-365048, compounds described in J.P. KOKOKU Nos. Sho 62-6223 and Sho 63-14340, and J.P. KOKAI No. Sho 59-174831, etc.

Preferred examples of (j) compounds having carbon-halogen bonds include, for example, compounds described in Wakabayashi et al., Bull. Chem. Soc. Japan, 42, 2924 (1969), compounds described in U.K. Patent No. 1388492, compounds described in J.P. KOKAI No. Sho 53-133428 and compounds described in D.E. Patent No. 3337024, etc.

In addition, compounds described in F. C. Scheaefer et al., J. Org. Chem., 29, 1527 (1964), compounds described in J.P. KOKAI No. Sho 62-58241 and compounds described in J.P. KOKAI No. Hei 5-281728, etc. may be included. Compounds described in D.E. Patent No. 2641100, compounds described in D.E. Patent No. 3333450, compounds described in D.E. Patent No. 3021590 or compounds described in D.E. Patent No. 3021599, etc. may be included.

Specific preferred examples of compounds in (a) to (j) above-mentioned include those shown as follows.

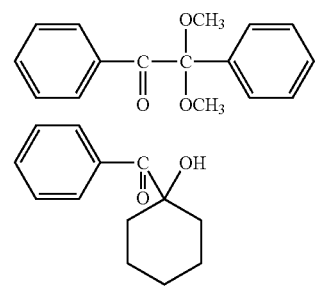

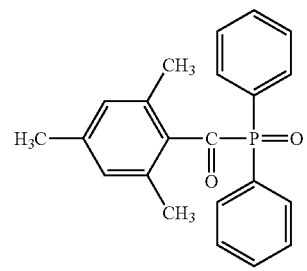

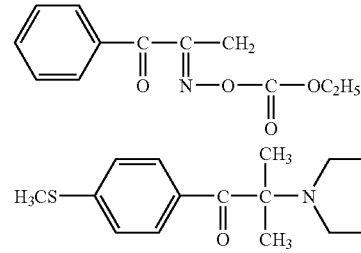

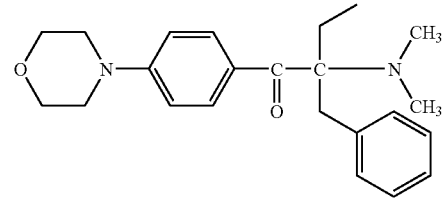

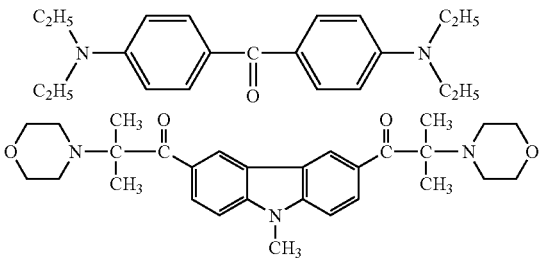

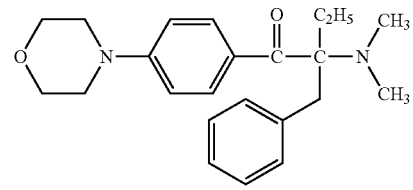

-continued
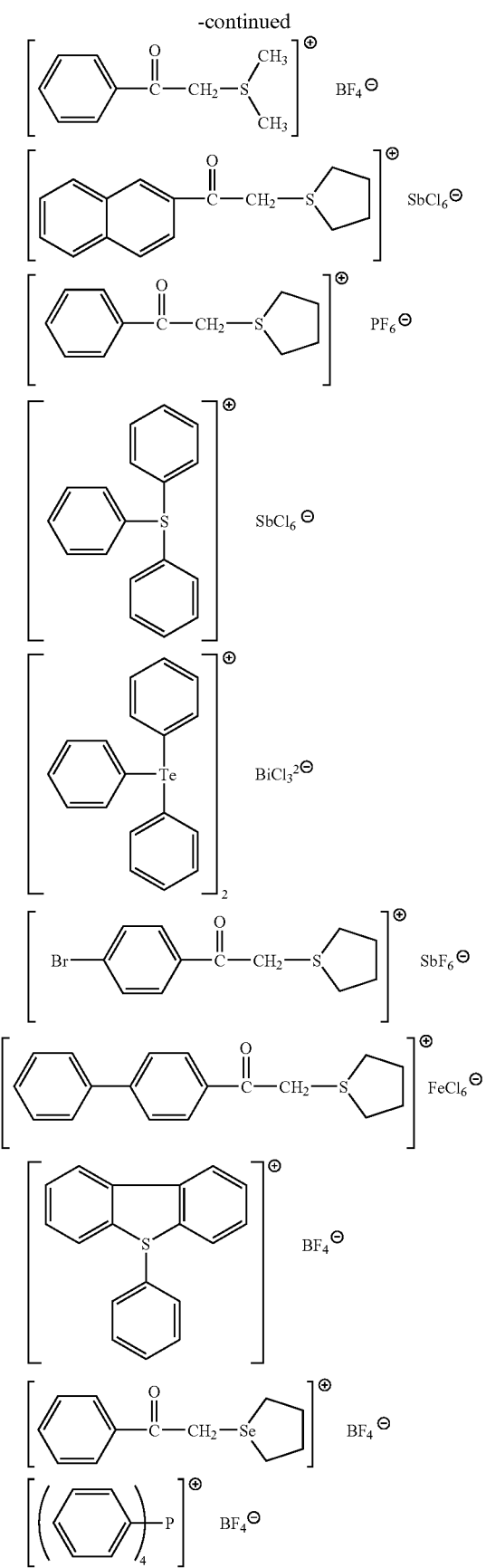
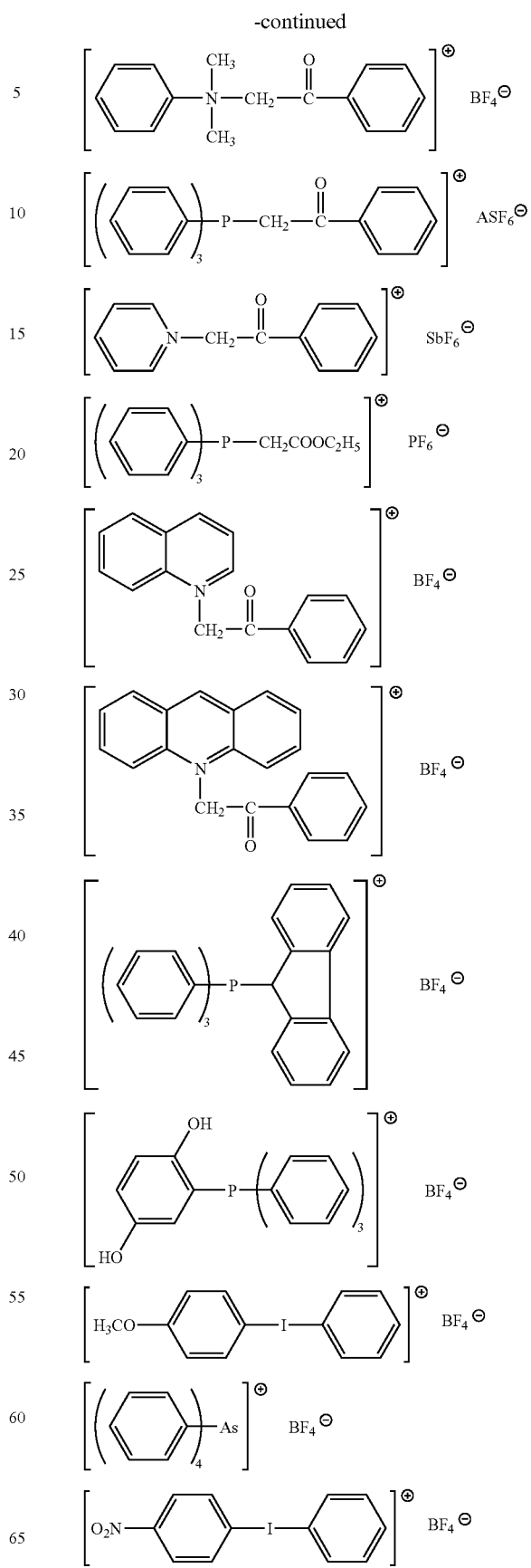

-continued
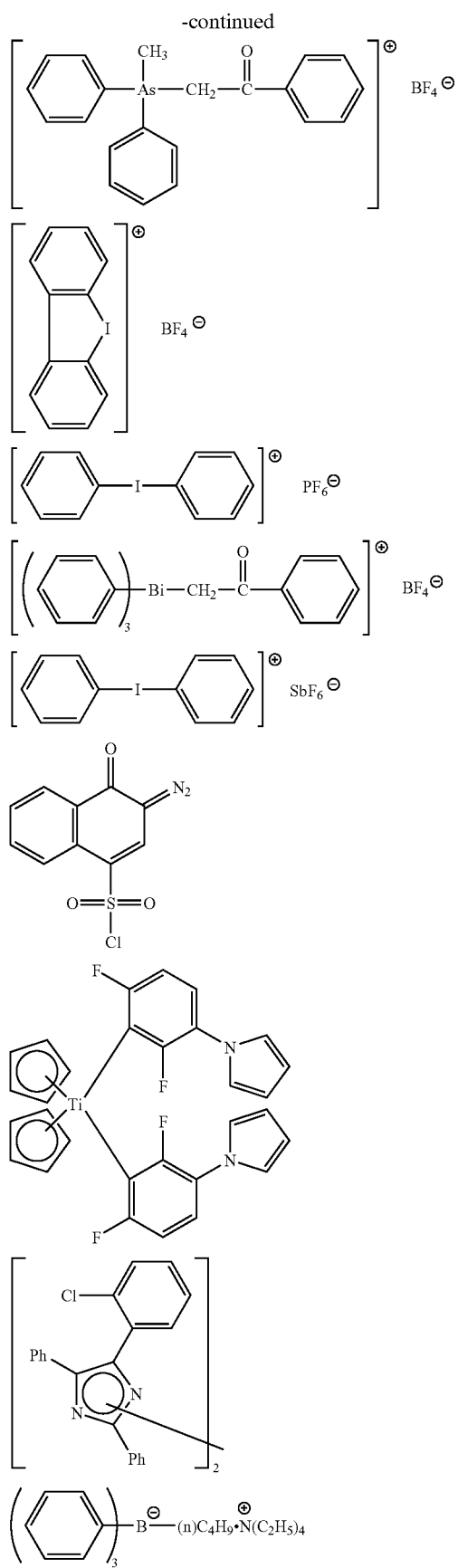
-continued
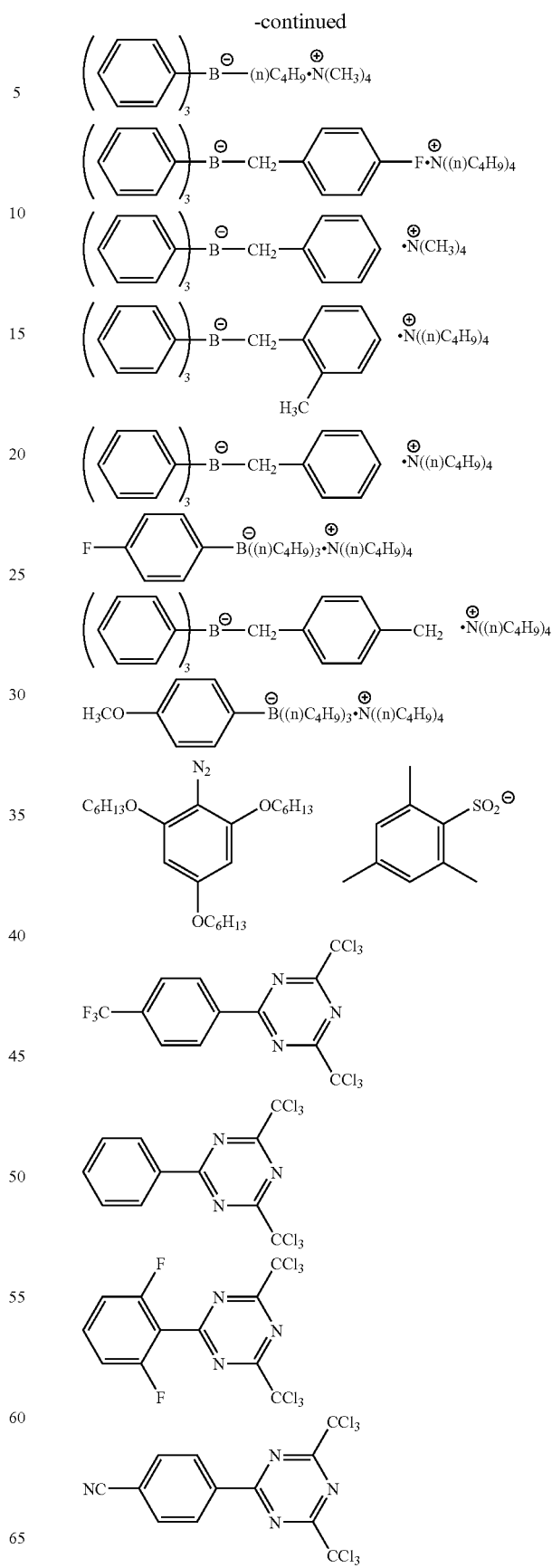

-continued

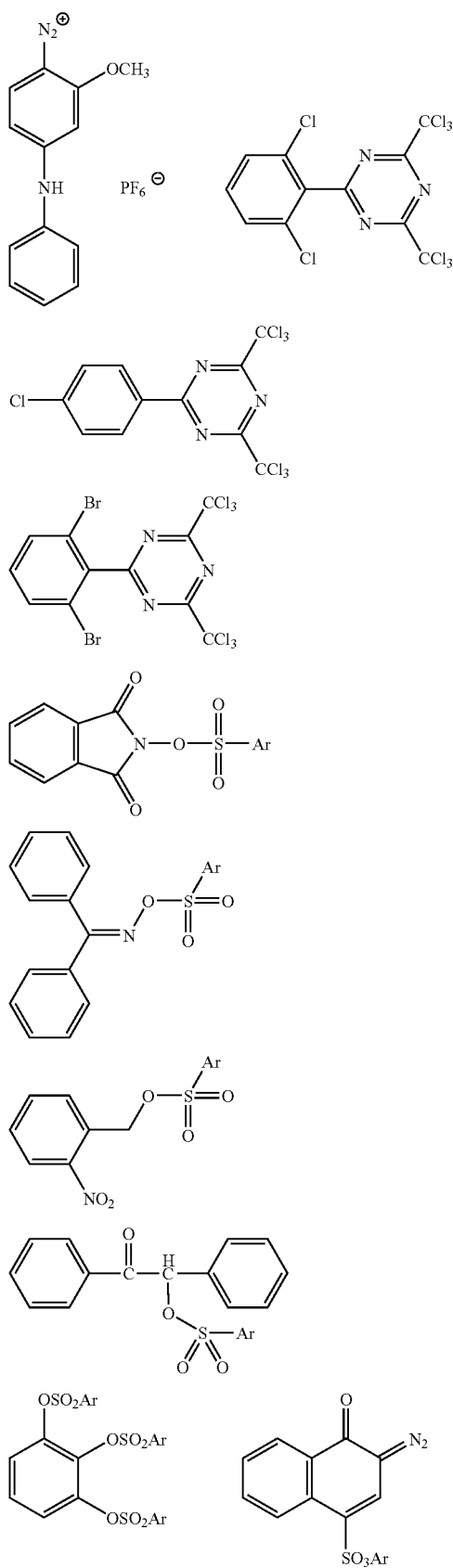

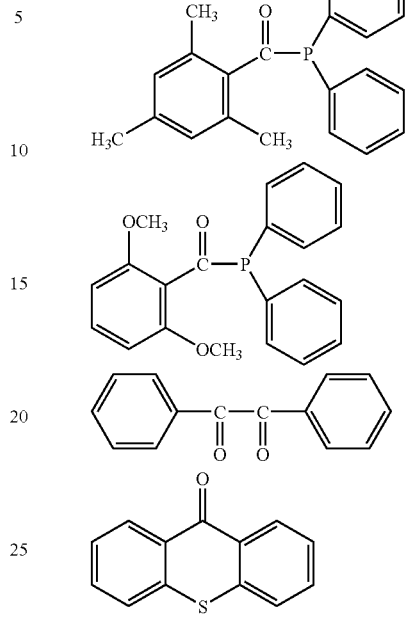

(Sensitizing Dye)

In present invention, a sensitizing dye may be added for the purpose of improving the sensitivity of a photopolymerization initiator. Preferred examples of sensitizing dye include those which belong to the compound class mentioned below and have an absorption wavelength ranging from 350 to 450 nm.

Polynuclear aromatics (for example, pyrene, perylene, triphenylene), xanthenes (for example, fluorescein, eosin, erythrosin, rhodamine B, rose bengal), cyanines (for example, thiacarbocyanine, oxacarbocyanine), merocyanines (for example, merocyanine, carbomerocyanine), thiazines (for example, thionine, methylene blue, toluidine blue), acridines (for example, acridine orange, chloroflavin, acriflavine), anthraquinones (for example, anthraquinone), squaliums (for example, squalium), coumarins (for example, 7-diethylamino-4-methylcoumarin).

More preferable examples of sensitizing dye include compounds represented by the following general formulas (IX) to (XIII).

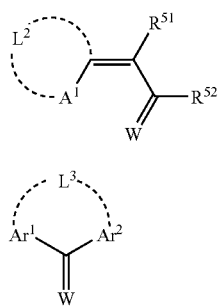

-continued

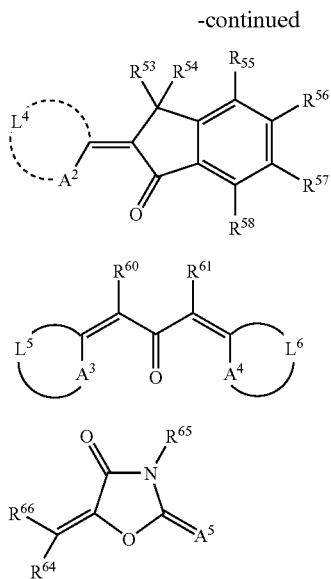

In the formula (IX), $A^1$ represents a sulfur atom or $NR^{50}$, wherein $R^{50}$ represents an alkyl group or an aryl group, $L^2$ represents a nonmetal atom group which cooperates with an adjacent $A^2$ and adjacent carbon atoms to form a basic nucleus of the dye, $R^{51}$ and $R^{52}$ each independently represents a hydrogen atom or a monovalent nonmetal atom group, or $R^{51}$ and $R^{52}$ may be linked each other to form an acidic nucleus of the dye. W represents an oxygen atom or a sulfur atom.

In the formula (X), $Ar^1$ and $A^2$ each independently represents an aryl group, and they are linked through a bond by -$L^3$-, wherein $L^3$ represents —O— or —S—. Moreover, W has the same meaning shown for the general formula (IX).

In the formula (XI), $A^2$ represents a sulfur atom or $NR^{59}$, $L^4$ represents a nonmetal atom group which cooperates with an adjacent $A^2$ and adjacent carbon atoms to form a basic nucleus of the dye, $R^{53}$, $R^{54}$, $R^{55}$, $R^{56}$, $R^{57}$ and $R^{58}$ each independently represents a monovalent nonmetal atom group, and $R^{59}$ represents an alkyl group or an aryl group.

In the formula (XII), $A^3$ and $A^4$ each independently represents —S— or —$NR^{62}$ or —$NR^{63}$—, wherein $R^{62}$ and $R^{63}$ each independently represents a substituted or unsubstituted alkyl group, or a substituted or unsubstituted aryl group, $L^5$ and $L^6$ each independently represents a nonmetal atom group which cooperates with an adjacent $A^3$, $A^4$ and adjacent carbon atoms to form a basic nucleus of the dye, $R^{60}$ and $R^{61}$ each independently represents a hydrogen atom or a monovalent nonmetal atom group, or they may be linked each other to form an aliphatic or an aromatic ring.

In the formula (XIII), $R^{66}$ represents an aromatic ring or heterocycle which may have any substituents, $A^5$ represents an oxygen atom, a sulfur atom or —$NR^{67}$—. $R^{64}$, $R^{65}$ and $R^{67}$ each independently represents a hydrogen atom or a monovalent nonmetal atom group, $R^{67}$ and $R^{64}$, and $R^{65}$ and $R^{67}$ may be linked each other to form an aliphatic or an aromatic ring, respectively.

Preferred specific examples of the compounds represented by the general formulas (IX) to (XIII) include those shown as follows.

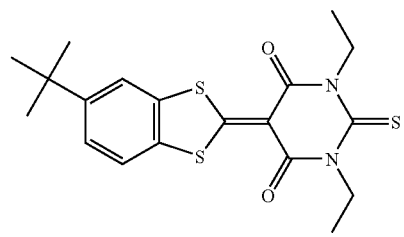

(A-1)

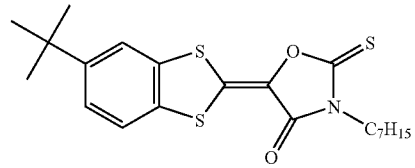

(A-2)

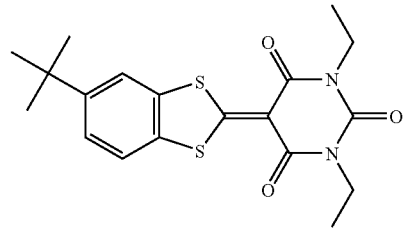

(A-3)

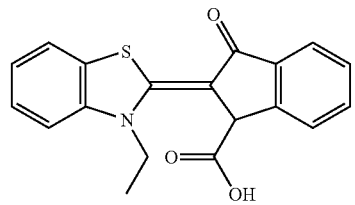

(A-4)

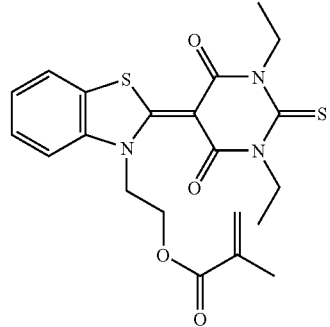

(A-5)

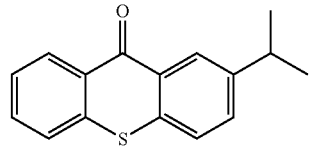

(A-6)

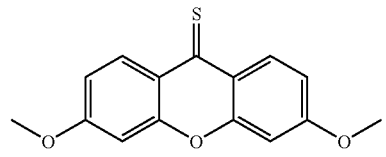

(A-7)

-continued

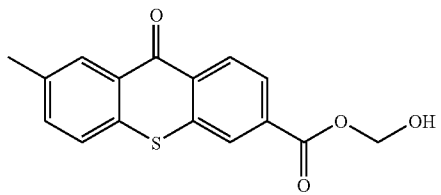 (A-8)

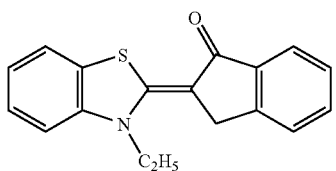 (A-9)

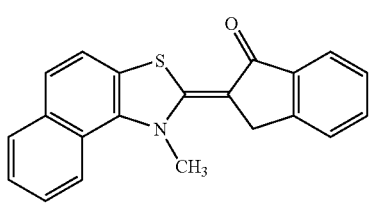 (A-10)

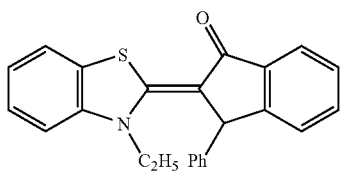 (A-11)

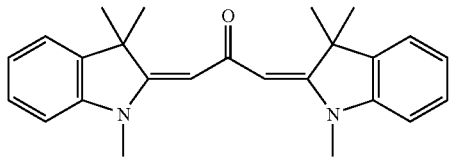 (A-12)

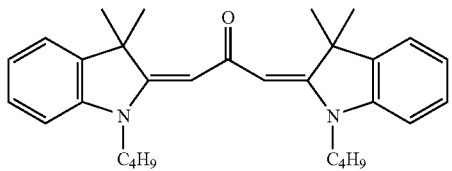 (A-13)

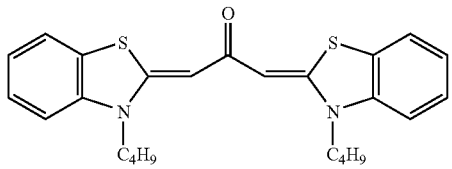 (A-14)

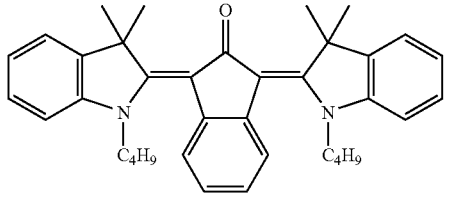 (A-15)

-continued

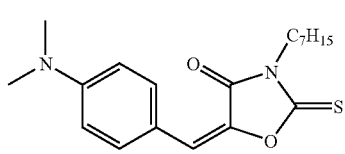 (A-16)

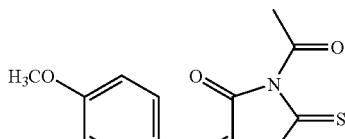 (A-17)

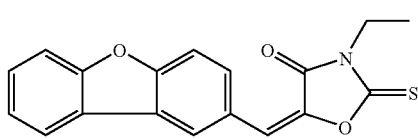 (A-18)

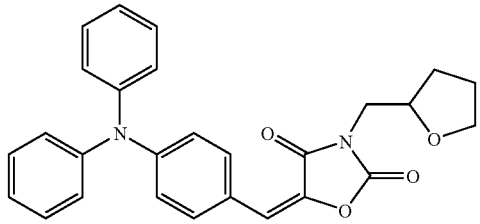 (A-19)

(Cosensitizer)

In the ink of the present invention, any known compound having the function of improving the sensitivity of the ink much more or preventing oxygen from inhibiting the polymerization and the like can be added as a cosensitizer.

Examples of such cosensitizer include amines, for example, compounds described in M. R. Sander et al., "Journal of Polymer Society", vol. 10, p. 3173 (1972), J.P. KOKOKU No. Sho 44-20189, J.P. KOKAI Nos. Sho 51-82102, Sho 52-134692, Sho 59-138205, Sho 60-84305, Sho 62-18537, Sho 64-33104, and Research Disclosure No. 33825, and specifically, include triethanolamine, p-dimethylaminobenzoic acid ethyl ester, p-formyldimethylaniline, p-methylthiqdimethylaniline and the like.

Other examples include thiols and sulfides, for example, thiol compounds described in J.P. KOKAI No. Sho 53-702, J.P. KOKOKU No. Sho 55-500806, J.P. KOKAI No. Hei 5-142772, disulfide compounds described in J.P. KOKAI No. Sho 56-75643, etc. and specifically, include 2-mercaptobenzothiazole, 2-mercaptobenzoxazole, 2-mercaptobenzimidazole, 2-mercapto-4(3H)-quinazoline, β-mercaptonaphthalene and the like.

Further other examples include amino acid compounds (for example, N-phenylglycine, etc.), organic metal compounds described in J.P. KOKOKU No. Sho 48-42965 (for example, tributyltinacetate, etc.), hydrogen donors described in J.P. KOKOKU No. Sho 55-34414, sulfur compounds described in J.P. KOKAI No. Hei 6-308727 (for example, trithiane, etc.), phosphorus compounds described in J.P. KOKAI No. Hei 6-250387 (for example, diethylphosphite, etc.), Si—H, Ge—H compounds described in J.P. KOKAI No. Hei 6-191605 and the like.

(Compound Capable of Forming a Complex with a Metal)

A compound capable of forming a complex with a metal refers to a compound that may improve the adhesion between a substrate and an ink by forming a complex with a metal element (for example, iron, manganese, copper, chromium, zinc, nickel, etc.) contained in the substrate in a trace amount, and includes phosphoric acid group-containing compound, phosphonic acid group-containing compound, amine group-containing compound, carboxylic acid group-containing compound, hydroxyl group-containing compound, and sulfonic acid group-containing compound and the like. These compounds preferably have two or more functional groups because such compounds may easily form a complex.

In addition, these compounds may have low molecular weight, or may be oligomer or polymer. Specifically, benzoic acid, iminodiacetic acid, N-(-hydroxyethyl)iminodiacetic acid, pyridine-2,6-dicarboxylic acid, 7-iodo-8-hydroxyquinoline-5-sulfonic acid, 2-amino-2-propyiphosphonic acid, 1,2-dihydroxybenzene-4-sulfonic acid, tylone, sorochromiumviolet R, 3-hydroxy-2-naphthoic acid, oxalic acid, oxydiacetic acid, salicylic acid, 5-sulfosalicylic acid, 8-hydroxy-7-(arylazo)-quinoline-5-sulfonic acid, phenylserine, acetohydroxamic acid, 3-hydroxy-5,7-disulfo-2-naphthoic acid, 2,3-dihydroxynaphthalene-6-sulfonic acid, sulfoxine, oxine, acetylacetone, hexafluoroacetylacetone, benzolyacetone, 6,6,7,7,8,8,8-heptafluoro-2,2-dimethyl-3,5-octanedione, trifluoroacetylacetone, dibenzoylmethane, dipivaloylmethane, malonic acid, succinic acid, 3,4-dihydroxybenzoic acid, gallic acid, 2-(3,4-dihydroxyphenyl)-2-(1,1 benzopyran)-3,5,7-triol, 3-hydroxy-7-sulfo-2-naphthoic acid, 1,2-dihydroxynaphthalene-4sulfonic acid, N,N-bis(2-hydroxyethyl)glycine, N-(phosphonomethyl)-iminodiacetic acid, N-(2hydroxyethyl)-iminodiacetic acid, iminobis(methylenephosphonic acid), tartaric acid, 1-oxopropane- 1,2-dicarboxylic acid, propane- 1,2,3-tricarboxylic acid, citric acid, desferrioxamine-B, 1,7-dihydroxy-4-sulfo-2-naphthoic acid, glutamic acid, pyridoxal-5(dihydrophosphate), nitrilotriacetic acid, amino(phenyl)methylene-diphosphonic acid, ethylenebis[imino-2(-hydroxyphenyl)methylene(methyl)-phosphponic acid], N-(2-hydroxyethyl)-ethylenedinitrilo-N,N', N'-triacetic acid, ethylenediaminetetraacetic acid, trimethylenedinitrilotetraacetic acid, cyclohexanediaminetetraacetic acid, (2-hydroxytrimethylene)-dinitrilotetraacetic acid, ethylenebis(oxyethylenenitrilo)tetraacetic acid, N,N,N',N'',N''-diethylenetriamine-pentaacetic acid, N,N,N',N'', N''',N'''-tetraethylenetetramine-hexaacetic acid, semi-xylenol orange, semi-methyithymol blue, 3-hydroxyglutamic acid, phosphoserine, amino 3-phosphopropionic acid, glyphosphate, phenylphosphonic acid, mono(2-methacryloyloxyethyl)acid phosphate, polyvinylphosphonic acid and the like.

Of these compounds, compounds capable of forming a complex with transition metals are preferable, and compounds capable of forming a complex with iron, manganese, nickel, copper and zinc which are the main components of dissimilar metals contained in an aluminum substrate are particularly preferable. Specifically, ethylenediamine-tetraacetic acid and gallic acid, etc. may be included. Moreover, a compound whose natural logarithm value of complex stability constant is 3 or more in an aqueous solution containing 1 mole/L of such metal ions at 25° C. is more preferable because such compound is excellent in storage stability.

The ink of the present invention shall comprise at least one compound capable of forming a complex with a metal and may comprise two or more compounds.

Compound capable of forming a complex with a metal may be contained preferably from 0.01 to 10% by weight based on the weight (solid content weight) of the ink composition of the present invention, more preferably from 0.01 to 5% by weight may be contained, because the addition of such compound within the foregoing range can provide a good adhesion as well as an excellent storage stability.

(Colorant)

Next, a colorant that may be used in the ink composition of the present invention is mentioned. Usable colorant in the present invention is not limited particularly, and a pigment with excellent weather resistance is preferable though any known colorant such as soluble dye and oily dye, etc. may be used.

Preferred pigments used in the present invention are described. In the ink composition of the present invention, pigment whose chromogenicity (density of the color for each addition density) is not necessarily high and which had not been put practical use in an ink for use in inkjet because producing a homogenous dispersion of microparticles by adding it into inks is difficult, so that high density application may result in the phenomenon of melt viscosity's excessively increasing can be used. Especially, for example, organic or inorganic pigments of the following number described to the color index can be used for this invention, but not limited thereto.

As red or magenta pigments, Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, 257, Pigment Violet 3, 19, 23, 29, 30, 37, 50, 88, Pigment Orange 13, 16, 20, 36, as blue or cyanogen pigments, Pigment Blue 1, 15, 15:1, 15:2, 15:3, 15:4, 15:6, 16, 17-1, 22, 27, 28, 29, 36, 60, as green pigments, Pigment Green 7, 26, 36, 50, as yellow pigments, Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, 193, as black pigments, Pigment Black 7, 28, 26, as white pigments, Pigment White 6, 18 and 21, etc. can be used according to the purpose.

For dispersing pigments, for example, each dispersion device such as ball mill, sand mill, attritor, roll mill, agitator, Henschel mixer, colloid mill, supersonic homogenizer, pearl mill, wet jet mill, paint shaker and the like can be used. Moreover, it is also possible to add a dispersant when pigments are dispersed. Although the kind of the dispersant is not particularly limited, it is preferable to use a high molecular dispersant including, for example, Solsperse series from Zeneca Co. Ltd. It is also possible to use a synergist corresponding to various pigments as a dispersing aid. These dispersant and dispersing aid are preferably added from 1 to 50 parts by weight based on 100 parts of the pigment. Dispersing medium, which is a solvent or a polymerizable compound according to the present invention, has preferable no solvent in radiation curing-type ink used for this invention, because the ink is reacted and cured immediately after the impact of it. When the solvent remains in the cured image, the problem of the deterioration of solvent resistance and VOC (Volatile Organic Compound) of the remaining solvent is caused. Therefore, the dispersing medium is not a solvent, and it is preferable to select monomers with the lowest viscosity in polymerizable compounds for dispersing aptitude.

The average particle size of each pigment particle is preferable from 0.08 to 0.5 μm, and the selection of pigments, dispersant and dispersing medium, dispersion condition, and filtration condition are set so that the largest particle size may become from 0.3 to 10 μm, more preferably from 0.3 to 3 μm. Blocking of a head nozzle can be suppressed by this particle size management, and the storage stability of ink, the transparency of ink and the curing sensitivity of ink can be maintained. Moreover, the added amount of a colorant is preferably from 1 to 10% by weight, more preferably from 2 to 8% by weight based on the total ink weight.

In addition to those mentioned above, if necessary, other components can be added to the ink for use in inkjet printing of the present invention.

When the electron beam, X-ray and the like is used as an irradiation light, the polymerization initiator is unnecessary, but when the ultraviolet light (UV light), visible light or infrared light is used as a line source, a radical polymerization initiator, a polymerization initiating aid, a sensitizing dye and the like corresponding to each wavelength are added. As for the amount of addition of these compounds, from 1 to 10% by weight based on the entire ink composition is roughly needed. As a polymerization initiator though well-known various compounds can be used, it is preferable to select from the one that may be dissolved in the polymerizable compound according to this invention and, specific polymerization initiators include, for example, xanthone or thioxanthone based polymerization initiators, benzophenone based polymerization initiators, quinone based polymerization initiators, phosphine based polymerization initiators and the like.

Moreover, it is preferable to add from 200 to 20000 ppm of polymerization inhibitor from the viewpoint of improving the shelf life. Since the ink for use in inkjet printing of the present invention is preferably heated within the range of 40 to 80° C. to provide lower viscosity before ejecting from the nozzle, it is preferable to add the polymerization inhibitor in order to prevent the head from being blocked due to the thermal polymerization, too. The polymerization inhibitors include, for example, hydroquinone, benzoquinone, p-methoxyphenol, TEMPO, TEMPOL, cupferron A1 and the like.

(Others)

Besides, well-known compounds can, if necessary, be used, and for example, surfactant, leveling additive, mat agent, and polyester resin, polyurethane resin, vinyl resin, acrylic resin, rubber resin, wax and the like to adjust the film properties can be appropriately selected to use. Moreover, in order to improve the adhesion to the recording medium such as polyolefin and PET, it is also preferable to contain tackifier which doesn't inhibit the polymerization. Specifically, cohesive polymer with high molecular weight described in J.P. KOKAI No. 2001-49200, p. 5-6 (for example, copolymer consisting of ester between (meth)acrylic acid and alcohol having an alkyl group with 1 to 20 carbon atoms, ester between (meth)acrylic acid and alicyclic alcohol with 3 to 14 carbon atoms, ester between (meth)acrylic acid and aromatic alcohol with 6 to 14 carbon atoms), low molecular weight tackifier resin having polymerizable unsaturated bonds and the like may be contained.

Moreover, it is also effective to add a trace amount of organic solvent to improve the adhesion with the recording medium. In this case, addition in the range where the problem of solvent resistance and VOC doesn't happen is effective, and its amount is preferably within a range of 0.1 to 5% by weight, more preferably within a range of 0.1 to 3% by weight, based on the entire ink composition.

Moreover, as the means to prevent the sensitivity decrease by the effect of shading of the ink colorant, it is one of the preferred embodiments that a cationically polymerizable monomer with long polymerization initiator life is combined with a polymerization initiator to form a radical/cationic hybrid-type cured ink.

The ink composition of the present invention has preferably an ink viscosity from 7 to 30 mPa·s, more preferably from 7 to 20 mPa·s at the temperature during ejecting in terms of ejecting ability, and it is preferable to select and to adjust properly the composition ratio so that its ink viscosity may become within said range. The viscosity of ink at 25 to 30° C. is from 35 to 500 mPa·s, more preferably from 35 to 200 mPa·s. If the viscosity at room temperature is set high, even when a porous recording medium is used, ink infiltration into the recording medium may be prevented to result in the decrease of uncured monomers and the decrease of odor and to further restrain ink blotting when the ink droplet impacts on the medium. As the result, the image quality is improved. When the viscosity of ink at 25 to 30° C. is less than 35 mPa·s, the effect of preventing the blot is low. On the other hand, when the viscosity of ink at 25 to 30° C. is more than 500 mPa·s, the problem is caused in the delivery of the ink liquid.

The surface tension of the ink composition of this invention is preferably from 20 to 30 mN/m, more preferably from 23 to 28 mN/m. When recording to various recording media such as polyolefin, PET, coated paper, non-coated paper and the like, it is preferably 20 mN/m or more from the viewpoint of the blot and infiltration, and it is preferably not more than 30 mN/m from the viewpoint of the wettability.

(Substrate)

Next, the substrate used in the lithographic printing plate of the present invention is described.

The substrate used for this invention is not limited especially, and may be a dimensionally steady hydrophilic plate. For example, paper, paper laminated with plastic (for example, polyethylene, polypropylene, polystyrene, etc.), metallic plate (for example, aluminum, zinc, copper, etc.), plastic film (for example, cellulose diacetate, cellulose triacetate, cellulose propionate, cellulose butyrate, cellulose acetate butyrate, nitrocellulose, polyethylene terephthalate, polyethylene, polystyrene, polypropylene, polycarbonate, polyvinyl acetal, etc.), paper or plastic film laminated or deposited with the metals mentioned above and the like may be included. Preferred substrate includes polyester film and aluminum plate. Of these substrates, an aluminum plate that has good dimensional stability and is relatively cheap is preferable.

The aluminum plate is a pure aluminum plate, an alloy plate that contains aluminum as a major component and trace amount of different elements, or a thin film of aluminum or aluminum alloy laminated with plastics. The different elements contained in the aluminum alloy include silicon, iron, manganese, copper, magnesium, chromium, zinc, bismuth, nickel, titanium and the like. The content of different elements in the alloy is preferably not more than 10% by weight. A pure aluminum plate is preferable in the present invention, but what slightly contains different elements is also acceptable because the production of a completely pure aluminum is difficult in the refinement technology. The aluminum plate whose composition is not specified, and one of materials which are well-known and public used can be appropriately utilized.

The thickness of the substrate is preferably from 0.1 to 0.6 mm, more preferably from 0.15 to 0.4 mm.

It is preferable to give surface treatment such as surface-roughening treatment and anodization treatment and the like preceding the use of the aluminum plate. The surface treatment makes easy the improvement of hydrophilicity and securing the adhesion between the image recording layer and the substrate. The aluminum plate may optionally be subjected to degreasing treatment with surfactant, organic solvent, alkaline aqueous solution and the like to remove the rolling oil on the surface before the plate is surface-roughened.

Such surface-roughening treatments are carried out by various methods and include, for instance, mechanical surface-roughening treatments, electrochemical surface-roughening treatments (methods for electrochemically dissolving the surface) and chemical surface-roughening treatments (methods for chemically and selectively dissolving the surface). The mechanical surface-roughening treatments can be carried out by any known methods such as ball graining, brush graining, blast graining and buff graining methods. Moreover, transfer method where ruggedness shape is transferred by a roll equipped with the ruggedness can be used at the rolling stage of aluminum.

The method of the electrochemical surface-roughening treatment includes, for instance, the method conducted by passing an alternating or direct current through the aluminum plate in an electrolyte containing an acid such as hydrochloric acid, nitric acid and the like. Moreover, the method using the mixture acid as described in J.P. KOKAI No. Sho 54-63902 may be included.

The surface-roughened aluminum plate may be optionally etched by an alkaline aqueous solution of potassium hydroxide, sodium hydroxide, etc. and further, after neutralizing treatment, if desired, be subjected to an anodization treatment in order to improve its wear resistance.

As the electrolyte used in the anodization treatment of the aluminum plate, various electrolytes which may form porous oxidized film can be used. In general, sulfuric acid, hydrochloric acid, oxalic acid, chromic acid or a mixture thereof are used. The concentration of the electrolyte may be appropriately determined depending on its kind.

The condition of the anodization treatment may vary depending on the electrolyte used, so it cannot be generalized, but it is generally preferable that the concentration of the electrolyte is from 1 to 80% by weight, the solution temperature is from 5 to 70° C., the current density is from 5 to 60 A/dm$^2$, the voltage is from 1 to 100 V, and the electrolysis time is from 10 seconds to 5 minutes. The amount of anodized film to be formed is preferably from 1.0 to 5.0 g/m$^2$, more preferably from 1.5 to 4.0 g/m$^2$. Within this range, good printing resistance and good damage resistance of non-image portion in a lithographic printing plate can be obtained.

The substrate used in the present invention may be the substrate having an anodized film by surface treatments as described above as it is. In order to improve the adhesion with the top layer, hydrophilicity, stain resistance, adiabatic property and the like much more, however, an enlarging treatment and a sealing treatment of micropores in the anodized film as described in J.P. KOKAI Nos. 2001-253181 and 2001-322365, and a treatment for giving hydrophilicity to the surface by dipping in an aqueous solution containing hydrophilic compounds, etc. may appropriately be selected to conduct. Of course, these enlarging treatment and sealing treatment shall not to be limited to those described above, and any conventionally known methods can be carried out.

(Sealing Treatment)

Examples of sealing treatment include, in addition to steam sealing treatment, a treatment with an aqueous solution containing inorganic fluorine compounds such as single treatment with fluorozirconic acid and a treatment with sodium fluoride, a steam sealing treatment with lithium chloride, and a sealing treatment with hot water.

Among them, a treatment with an aqueous solution containing inorganic fluorine compounds, a sealing treatment with steam and a sealing treatment with hot water are preferable. Each treatment is described as follows.

(Sealing Treatment with an Aqueous Solution Containing Inorganic Fluorine Compounds)

The inorganic fluorine compounds used in the sealing treatment with an aqueous solution containing inorganic fluorine compounds include preferably metallic fluorides.

Specifically, for example, such compounds include sodium flouride, potassium flouride, calcium fluoride, magnesium fluoride, sodium fluorozirconate, potassium fluorozirconate, sodium fluorotitanate, potassium fluorotitanate, ammonium fluorozirconate, ammonium fluorotitanate, potassium fluorotianate, fluorozirconic acid, fluorotitanic acid, hexafluorosilicic acid, nickel fluoride, iron fluoride, fluorophosphoric acid, ammonium fluorophosphate and the like. Of these compounds, sodium fluorozirconate, sodium fluorotitanate, fluorozirconic acid and fluorotitanic acid are preferable.

The concentration of the inorganic fluorine compound in an aqueous solution is 0.01% by weight or more, more preferably 0.05% by weight or more, in terms of performing sufficient sealing of micropores in the anodized film. Moreover, it is preferably not more than 1% by weight, more preferably not more than 0.5% by weight, in terms of stain resistance.

The aqueous solution containing the inorganic fluorine compounds preferably comprises further phosphate compounds. When comprising phosphate compounds, developing ability on a machine and stain resistance may be improved because the hydrophilicity of the surface of the anodized film is increased.

Phosphate compounds preferably include, for example, phosphates of metals such as alkaline metals, alkaline earth metals and the like.

Specifically, such phosphates include, for example, zinc phosphate, aluminum phosphate, ammonium phosphate, diammonium hydrogenphosphate, ammonium dihydrogenphosphate, monoammonium phosphate, monopotasium phosphate, monosodium phosphate, potassium dihydrogenphosphate, dipotassium hydrogenphosphate, calcium phosphate, ammonium sodium hydrogenphosphate, magnesium hydrogenphosphate, magnesium phosphate, ferrous phosphate, ferric phosphate, sodium dihydrogenphosphate, sodium phosphate, disodium hydrogenphosphate, lead phosphate, diammonium phosphate, calcium dihydrogenphosphate, lithium phosphate, phosphotungstic acid, ammonium phosphotungstate, sodium phosphotungstate, ammonium phosphomolybdate, sodium phosphomolybdate, sodium phosphite, sodium tripolyphosphate, sodium pyrophosphate and the like. Of these compounds, sodium dihydrogenphosphate, disodium hydrogenphosphate, potassium dihydrogenphosphate and dipotassium hydrogenphosphate are preferable.

A combination of inorganic fluorine compound and phosphate compound is not particularly limited, but such aqueous solution preferably contains at least sodium fluorozirconate as an inorganic fluorine compound and at least sodium dihydogenphosphate as a phosphate compound.

The concentration of the phosphate compound in the aqueous solution is 0.01% by weight or more in terms of the improvement of developing ability on a machine and stain resistance. Moreover, it is preferably not more than 20% by weight, more preferably not more than 5% by weight, in terms of the solubility.

The ratio of each compound in the aqueous solution is not particularly limited, but the mass ratio of the inorganic fluorine compound and the phosphate compound is preferably from 1/200 to 10/1, more preferably from 1/30 to 2/1.

Moreover, the temperature of the aqueous solution is preferably 20° C. or more, more preferably 40° C. or more, and it is preferably not more than 100° C., more preferably not more than 80° C.

In addition, the pH of the aqueous solution is preferably pH 1 or more, more preferably pH 2 or more, and it is preferably not more than pH 11, more preferably not more than pH 5.

The method of the sealing treatment with inorganic fluorine compounds is not particularly limited, and includes, for example, dipping method, spray method and the like. These methods can be used one or multiple times separately, or two or more methods may also combined to use.

Of these methods, dipping method is preferable. When treated using dipping method, the treatment time is preferably 1 second or more, more preferably 3 seconds or more, and it is preferably not more than 100 seconds, more preferably not more than 20 seconds.

(Sealing Treatment with Steam)

The method of sealing treatment with steam includes, for example, the method wherein pressurized or atmospheric steam is continuously or discontinuously contacted with the anodized film.

The temperature of steam is preferably 80° C. or more, more preferably 95° C. or more, and it is preferably not more than 105° C.

The pressure of steam is preferably within the range of (atmospheric pressure −50 mmAq) to (atmospheric pressure +300 mmAq) (from $1.008 \times 10^5$ to $1.043 \times 10^5$ Pa).

Moreover, the time of contacting the anodized film with steam is preferably 1 second or more, more preferably 3 seconds or more, and it is preferably not more than 100 seconds, more preferably not more than 20 seconds.

(Sealing Treatment with Hot Water)

The method of sealing treatment with hot water includes, for example, the method wherein the aluminum plate on which anodized film has been formed is dipped in hot water.

Hot water may comprise inorganic salts (for example, phosphates) or organic salts.

The temperature of hot water is preferably 80° C. or more, more preferably 95° C. or more, and it is preferably not more than 100° C.

Moreover, the time of dipping in hot water is preferably 1 second or more, more preferably 3 seconds or more, and it is preferably not more than 100 seconds, more preferably not more than 20 seconds.

The treatment of giving hydrophilicity to the surface used for the present invention includes an alkaline metal silicate method as described in each specification of U.S. Pat. Nos. 2,714,066, 3,181,461, 3,280,734 and 3,902,734. In this method, the substrate is treated by dipping in an aqueous solution containing sodium silicate, etc., or is treated by electrolysis. Besides, such method includes the method of treating with potassium fluorozirconate described in J.P. KOKOKU No. Sho 36-22063, the method of treating with polyvinylphosphonic acid as described in each specification of U.S. Pat. Nos. 3,276,868, 4,153,461 and 4,689,272 and the like.

For the substrate in the present invention, its centerline average roughness is preferably from 0.10 to 1.2 μm. Within this range, good adhesion with the image-recording layer, good printing resistance and good stain resistance may be obtained.

(Inkjet Printing Method and Inkjet Printing Device)

Next, inkjet printing method and inkjet printing device that may be preferably adopted for the present invention are described.

In inkjet printing method, it is preferable that the foregoing ink composition is heated to 40-80° C. to lower the viscosity of the ink composition to 7-30 mPa·s followed by ejecting it, and higher ejecting-stability may be realized by using such method. In general, in a radiation curing-type ink composition, the variation width of its viscosity due to temperature variation during printing is wide because the viscosity is generally higher than that of an aqueous ink. This viscosity variation of the ink composition as it is may largely affect droplet size and droplet ejecting rate, thereby may cause the deterioration of image quality, so the temperature of the ink composition during printing is needed to keep constantly as much as possible. The controlled width of the temperature of the ink composition is preferably the setting temperature ±5° C., more preferably the setting temperature ±2° C., and further more preferably the setting temperature ±1° C.

In the inkjet printing device, providing with the stabilization means of the temperature of the ink composition is one feature, and the piping system from an ink tank (a middle tank if it exists) to a nozzle ejecting side and all of the members become objects as for the part which may make a constant temperature.

The temperature control method is not especially limited, and for example, it is preferable that multiple temperature sensors are installed at each piping part to provide heating control according to the ink composition flow rate and the environmental temperature. Moreover, the head unit heated is preferably isolated thermally or insulated so that the device body may not be affected by the temperature of outside air. In order to shorten printer start-up time, or in order to reduce thermal energy loss, it is preferable that the head unit is isolated from other parts and that the thermal capacity of the entire heating unit is reduced.

Next, the irradiation condition of radiant ray is described. A basic irradiation method is disclosed in J.P. KOKAI No. Sho 60-132767. Specifically, light sources are installed on both sides of the head unit, and the head and the light sources are scanned in the shuttle method. After the impact of ink, the irradiation will be done after a certain time. In addition, curing is completed by another light source that doesn't involve any drive. In WO99/54415, the method using optical fiber and the method wherein a collimated light source is applied to a mirror plane installed on the head unit side and UV light is irradiated to the recording part have been disclosed as irradiation method. In this invention, these irradiation methods can be used.

Moreover, in present invention, it is preferable to irradiate after the time from 0.01 to 0.5 seconds, more preferably from 0.01 to 0.3 seconds, even more preferably from 0.01 to 0.15 seconds from the impact, while heating the ink composition to a certain temperature. Controlling in ultra short time of time until irradiating from the impact like this can prevent the impacted ink from blotting before curing. Moreover, remaining of unreacted monomers can be suppressed because it is possible to expose the ink composition even against porous recording medium before the ink composition infiltrates in a deep region where the light source cannot reach, and as the result, the odor can be decreased. A high synergy effect will be brought by combining the inkjet printing method as abovementioned with the ink composition of this invention. Especially, high effect can be achieved by using the ink composition whose ink viscosity is from 35 to 500 MPa·s at 25° C. The dot diameter of the impacted ink can be kept constant even against various recording media with different wettabilities on their surfaces by adopting such recording method, and the image quality improves. In order to obtain color images, superimposing from the color with lower brightness sequentially is preferable. The irradiated radiant ray cannot reach lower ink easily when ink with lower brightness is superimposed, and then inhibition of the curing sensitivity, increase of remaining monomers, generation of odor and deterioration in adhesion are liable to be caused. Moreover, it is possible to eject and expose all colors together, but exposing every one color is preferable in the viewpoint of curing promotion.

There is especially no limitation for an inkjet-printing device used for this invention, and a commercially available inkjet recording device can be used. That is, in the present invention, it is possible to record to a recording medium using a commercially available inkjet recording device.

EXAMPLES

The present invention is more specifically explained by the following examples, but the present invention shall not be limited by these examples.

Examples 1-5

(Preparation of Pigment Dispersion)

Pigment dispersion 1 of magenta was prepared according to the following method. A dispersion condition was appropriately selected using a well-known dispersion device to prepare pigment dispersion having average size of each pigment particle ranging from 0.2 to 0.3 µm, and then filtration under heating was performed to prepare magenta pigment dispersion 1.

| (Magenta Pigment Dispersion 1) | |
|---|---|
| C.I. Pigment Red 57:1 | 15 parts by weight |
| Polymer Dispersant | 5 parts by weight |
| (Solsperse series made by Zeneca company) | |
| Stearyl acrylate | 80 parts by weight |

The magenta ink was prepared by using the magenta pigment dispersion 1 above-mentioned according to the following method.

| (Magenta Ink 1) | |
|---|---|
| Magenta Pigment Dispersion 1 | 20 parts by weight |
| Compound A-18 described in the above table | 50 parts by weight |
| Difunctional aromatic urethane acrylate described below (molecular weight 1500) | 15 parts by weight |
| Hexafunctional aliphatic urethane acrylate described below (molecular weight 1000) | 5 parts by weight |
| Polymerization Initiator (IRGACURE 184 made by Chiba Specialty Chemicals) | 8 parts by weight |
| Ethylenediamine tetraacetic acid (a compound capable of forming a complex with a metal) | 2 parts by weight |
| (Magenta Ink 2) | |
| Magenta Pigment Dispersion 1 | 20 parts by weight |
| 1,6-Hexanediol diacrylate | 50 parts by weight |
| Lactone modified acrylate described below (molecular weight 458) | 20 parts by weight |
| Hexafunctional aliphatic urethane acrylate described below (molecular weight 1000) | 5 parts by weight |
| Polymerization Initiator (IRGACURE 184 made by Chiba Specialty Chemicals) | 8 parts by weight |
| Ethylenediamine tetraacetic acid (a compound capable of forming a complex with a metal) | 2 parts by weight |
| (Magenta Ink 3) | |
| Magenta Pigment Dispersion 1 | 20 parts by weight |
| Compound D-7 described in the above table | 70 parts by weight |
| Hexafunctional aliphatic urethane acrylate described below (molecular weight 1000) | 5 parts by weight |
| Polymerization Initiator (IRGACURE 184 made by Chiba Specialty Chemicals) | 3 parts by weight |
| Gallic acid (a compound capable of forming a complex with a metal) | 2 parts by weight |
| (Magenta Ink 4) | |
| Magenta Pigment Dispersion I | 20 parts by weight |
| Stearyl acrylate | 70 parts by weight |
| Hexafunctional aliphatic urethane acrylate described below (molecular weight 1000) | 5 parts by weight |
| Polymerization Initiator (IRGACURE 184 made by Chiba Specialty Chemicals) | 3 parts by weight |
| Gallic acid (a compound capable of forming a complex with a metal) | 2 parts by weight |

-continued (Magenta Ink 5)

| | |
|---|---|
| Magenta pigment Dispersion 1 | 20 parts by weight |
| Compound D-7 described in the above table | 70 parts by weight |
| Hexafunctional aliphatic urethane acrylate described below (molecular weight 1000) | 4 parts by weight |
| Polymerization Initiator (IRGACURE 184 made by Chiba Specialty Chemicals) | 3 parts by weight |
| N-(Phosphpnomethyl)-imino diacetic acid (a compound capable of forming a complex with a metal) | 3 parts by weight |

(Magenta Ink 6: comparative example 1)

| | |
|---|---|
| Magenta Pigment Dispersion 1 | 20 parts by weight |
| Compound A-1 8 described in the above table | 50 parts by weight |
| Difunctional aromatic urethane acrylate described below (molecular weight 1500) | 15 parts by weight |
| Hexafunctional aliphatic urethane acrylate described below (molecular weight 1000) | 7 parts by weight |
| Polymerization Initiator (IRGACURE 184 made by Chiba Specialty Chemicals) | 8 parts by weight |

(Magenta Ink 7: comparative example 2)

| | |
|---|---|
| Magenta Pigment Dispersion 1 | 20 parts by weight |
| Compound D-7 described in the above table | 70 parts by weight |
| Hexafunctional aliphatic urethane acrylate described below (molecular weight 1Q00) | 5 parts by weight |
| Polymerization Initiator (IRGACURE 184 made by Chiba Specialty Chemicals) | 5 parts by weight |

Difunctional aromatic urethane acrylate
Product prepared by capping the terminal of condensate (Mw 1500):

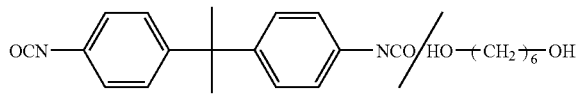

with

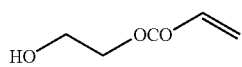

Hexafunctional aromatic urethane acrylate
[1]Product prepared by capping the terminal of condensate (Mw 1500):

with

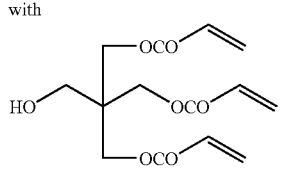

Lactone modified acrylate

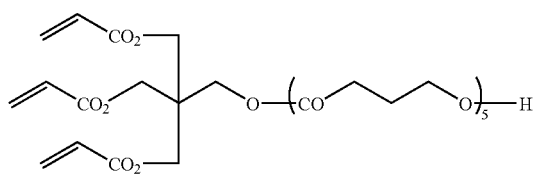

(Inkjet Image Recording)

Next, recording onto a recording medium using a commercially available inkjet-printing device having a piezo-type inkjet nozzle was carried out. The ink supply system consists of a source tank, a feeder line, an ink supply tank immediately before an inkjet head, a filter and a piezo-type inkjet head, and insulation and warming were applied from the ink supply tank to the inkjet head part. Temperature sensors were provided in the vicinity of the ink supply tank and the nozzle of the inkjet head respectively, and then temperature was controlled so that the nozzle part might always become 70° C.±2° C. The piezo-type inkjet head was controlled so that the ink is ejected in multi size dots of 8-30 pl by the resolution of 720×720 dpi.

After the impact, UV-A light was condensed at 100 mW/cm² of the exposed surface illuminance, and exposure system, main scanning speed and ejecting frequency were adjusted so that irradiation might start 0.1 seconds after the ink had impacted onto the recording medium. Moreover, the exposure time was variable, and the exposure energy was irradiated. As used herein, the term "dpi" refers to the number of dots per 2.54 cm.

Each ink prepared as described above was used to eject at 25° C. of environmental temperature, and then ultraviolet light was irradiated every one color. The exposing was performed by an energy curing the ink completely, wherein the total exposure energy was uniformly 300 mJ/cm², so that the ink lost its cohesiveness on palpation.

In the ink composition prepared by the above-mentioned examples and the comparative examples, the viscosity of ink at the ejecting temperature was within the range of 7 to 20 mPa·s.

(Evaluation of Inkjet Image)

Then, for each image formed, ink blot and adhesion of the image on a sand dressed aluminum substrate were evaluated according to the following method.

(Evaluation of Ink Blot of the Image on a Sand Dressed Aluminum Substrate)

The image printed on the aluminum substrate that had sand dressed was evaluated according to the following standard.
○: There is no blot between the adjoining dots.
Δ: The dot blots slightly.
×: The dot blots, and the image grows dim obviously.

(Evaluation of Adhesion on a Sand Dressed Aluminum Substrate)

For the printed images made as above-mentioned, the samples whose printed surfaces were not damaged at all, and the samples whose printed surfaces were made 11 cuts longitudinally and latitudinally at intervals of 1 mm to produce 100 go board eyes of 1 mm square in accordance with JISK 5400 were prepared. Then, putting Cellophane (registered trademark) adhesive tape on each printed surface, peeling it off quickly at the angle of 90 degrees, and the situations of the printed image that remained without being peeled off and the go board eyes were evaluated in accordance with the following standard.
○: No peeling of the printed image is recognized at all in even the go board eye test.
Δ: Some ink peeling is recognized in the go board eye test, but peeling is hardly recognized if the ink surface is not damaged.
×: Peeling by Cellophane (registered trademark) adhesive tape is easily recognized in both conditions.

These evaluation results are shown in Table 17.

TABLE 17

| | Magenta Ink Number | Ink Blotting | Adhesion |
|---|---|---|---|
| Example 1 | 1 | ○ | ○ |
| Example 2 | 2 | ○ | ○ |
| Example 3 | 3 | ○ | ○ |
| Example 4 | 4 | ○ | ○ |
| Example 5 | 5 | ○ | ○ |
| Comparative example 1 | 6 | X | X |
| Comparative example 2 | 7 | X | X |

As seen from the above Table 17, as for any ink of the present invention, ink blot was not seen on the sand dressed aluminum substrate at all, and it was excellent in the adhesion test, where peeling of the printed image was not seen at all (Examples 1 to 5). On the other hand, for as the ink of Comparative examples 1 and 2 which did not contain any compounds capable of forming a complex with a metal, ink blot was seen on the sand dressed aluminum substrate, and peeling of the ink was recognized also in the adhesion test.

What is claimed is:

1. A method for inkjet printing comprising the following steps:
   a step of providing a substrate comprising a metal selected from the group consisting of manganese, copper, chromium, zinc and nickel,
   a step of ejecting an ink comprising at least a colorant, a polymerizable compound, a photopolymerization initiator, and a compound capable of forming a complex with the metal in the substrate, onto the substrate, and
   a step of irradiating an ultraviolet ray to cure the ink to form a hydrophobic image on the substrate,
   wherein the compound capable of forming a complex with a metal has two or more functional groups and is selected from the group consisting of phosphoric acid group-containing compounds, phosphonic acid group-containing compounds, amine group-containing compounds, carboxylic acid group-containing compounds, hydroxyl group-containing compounds, and sulfonic acid group-containing compounds.

2. The method of claim 1, wherein the compound capable of forming a complex with a metal is selected from the group consisting of benzoic acid, iminodiacetic acid, N-(-hydroxyethyl)iminodiacetic acid, pyridine-2,6-dicarboxylic acid, 7-iodo-8-hydroxyquinoline-5-sulfonic acid, 2-amino-2-propylphosphonic acid, 1,2-dihydroxybenzene-4-sulfonic acid, tylone, sorochromiumviolet R, 3-hydroxy-2-naphthoic acid, oxalic acid, oxydiacetic acid, salicylic acid, 5-sulfosalicylic acid, 8-hydroxy-7-(arylazo)-quinoline-5-sulfonic acid, phenylserine, acetohydroxamic acid, 3-hydroxy-5,7-disulfo-2-naphthoic acid, 2,3-dihydroxynaphthalene-6-sulfonic acid, sulfoxine, oxine, acetylacetone, hexafluoroacetylacetone, benzoylacetone, 6,6,7,7,8,8,8-heptafluoro-2,2-dimethyl-3,5-octanedione, trifluoroacetylacetone, dibenzoylmethane, dipivaloylmethane, malonic acid, succinic acid, 3,4-dihydxoxybenzoic acid, gallic acid, 2-(3,4-dihydroxyphenyl)-2-(1,1-benzopyran)-3,5,7-triol, 3-hydroxy-7-sulfo-2-naphthoic acid, 1,2-dihydroxynaphthalene-4-sulfonic acid, N,N-bis(2-hydroxyethyl)glycine, N-(phosphonomethyl)-iminodiacetic acid, N-(2-hydroxyethyl)-iminodiacetic acid, iminobis(methylenephosphonic acid), tartaric acid, 1-oxopropane-1,2-dicarboxylic acid, propane-1,2,3-tricarboxylic acid, citric acid, desferrioxamine-B, 1,7-dihydroxy-4-sulfo-2-naphthoic acid, glutamic acid, pyridoxal-5-(dihydrophosphate), nitrilotriacetic acid, amino(phenyl)methylene-diphosphonic acid, ethylenebis[imino-2(-hydroxyphenyl)methylene(methyl)-phosphponic acid], N-(2-hydroxyethyl)-ethylenedinitrilo-N,N',N'-triacetic acid, ethylenediaminetetraacetic acid, trimethylenedinitrilotetraacetic acid, cyclohexanediaminetetraacetic acid, (2-hydroxytrimethylene)-dinitrilotetraacetic acid, ethylenebis(oxyethylenenitrilo)tetraacetic acid, N,N,N',N",N"-diethylenetriamine-pentaacetic acid, N,N,N',N",N"',N"'-tetraethylenetetramine -hexaacetic acid, semi-xylenol orange, semi-methylthymol blue, 3-hydxoxyglutamic acid, phosphoserine, amino-3-phosphopropionic acid, glyphosphate, phenylphosphonic acid, mono(2-methacryloyloxyethyl)acid phosphate and polyvinylphosphonic acid.

3. The method of claim 2, wherein the compound capable of forming a complex with a metal is gallic acid, ethylenediamine tetraacetic acid or N-(phosphonomethyl)iminodiacetic acid.

* * * * *